United States Patent
Matsushita et al.

(10) Patent No.: US 9,281,517 B2
(45) Date of Patent: Mar. 8, 2016

(54) BATTERY, BATTERY PACK, ELECTRONIC APPARATUS, ELECTRIC VEHICLE, ELECTRIC POWER STORAGE APPARATUS, AND ELECTRIC POWER SYSTEM

(71) Applicant: Sony Corporation, Tokyo (JP)

(72) Inventors: Tadashi Matsushita, Fukushima (JP); Koji Morita, Fukushima (JP); Hisashi Tsujimoto, Tochigi (JP); Takashi Ono, Tochigi (JP); Takehiko Ishii, Fukushima (JP)

(73) Assignee: Sony Corporation, Tokyo (JP)

( * ) Notice: Subject to any disclaimer, the term of this patent is extended or adjusted under 35 U.S.C. 154(b) by 118 days.

(21) Appl. No.: 14/073,409

(22) Filed: Nov. 6, 2013

(65) Prior Publication Data

US 2014/0141303 A1     May 22, 2014

(30) Foreign Application Priority Data

Nov. 16, 2012 (JP) .................. 2012-252200

(51) Int. Cl.
*H01M 4/36* (2006.01)
*H01M 10/0587* (2010.01)
*H01M 4/133* (2010.01)
*H01M 4/587* (2010.01)
*H01M 10/0525* (2010.01)

(52) U.S. Cl.
CPC ............. *H01M 4/366* (2013.01); *H01M 4/133* (2013.01); *H01M 4/364* (2013.01); *H01M 4/587* (2013.01); *H01M 10/0525* (2013.01); *Y02E 60/122* (2013.01)

(58) Field of Classification Search
CPC . H01M 4/366; H01M 10/0587; H01M 4/364; H01M 4/133; H01M 4/587; Y02E 60/122
See application file for complete search history.

(56) References Cited

U.S. PATENT DOCUMENTS

| | | | |
|---|---|---|---|
| 2005/0277018 A1* | 12/2005 | Kim | 429/120 |
| 2010/0086858 A1* | 4/2010 | Kim | 429/246 |
| 2014/0050958 A1* | 2/2014 | Kwon et al. | 429/94 |
| 2014/0120417 A1* | 5/2014 | Matsushita et al. | 429/211 |

FOREIGN PATENT DOCUMENTS

| | | |
|---|---|---|
| JP | 04-012471 | 1/1992 |
| JP | 10-079245 | 3/1998 |
| JP | 10-228930 | 8/1998 |
| JP | 11-329408 | 11/1999 |
| JP | 2000-195556 | 7/2000 |
| JP | 2001-110453 | 4/2001 |
| JP | 2001-351610 | 12/2001 |
| JP | 2007-305598 | 11/2007 |
| JP | 2008-234855 | 10/2008 |

\* cited by examiner

*Primary Examiner* — Stewart Fraser
(74) *Attorney, Agent, or Firm* — K&L Gates LLP

(57) ABSTRACT

An anode includes an anode double side coating section; a first anode single-side coating section; and an anode double side non-coating section, the anode double side non-coating section, the first anode single-side coating section, and the anode double side coating section are provided in this order from a first end on the side of spiral winding start of the anode, and in an anode, ("Area density of an anode mixture layer on the first main surface side of the first anode single-side coating section")/("Area density of the anode mixture layer on the first main surface side of sections other than the first anode single-side coating section") is equal to or more than about 1.2.

14 Claims, 9 Drawing Sheets

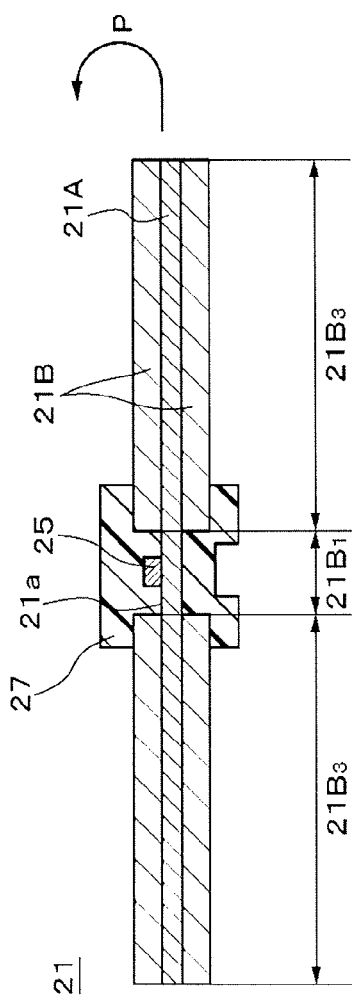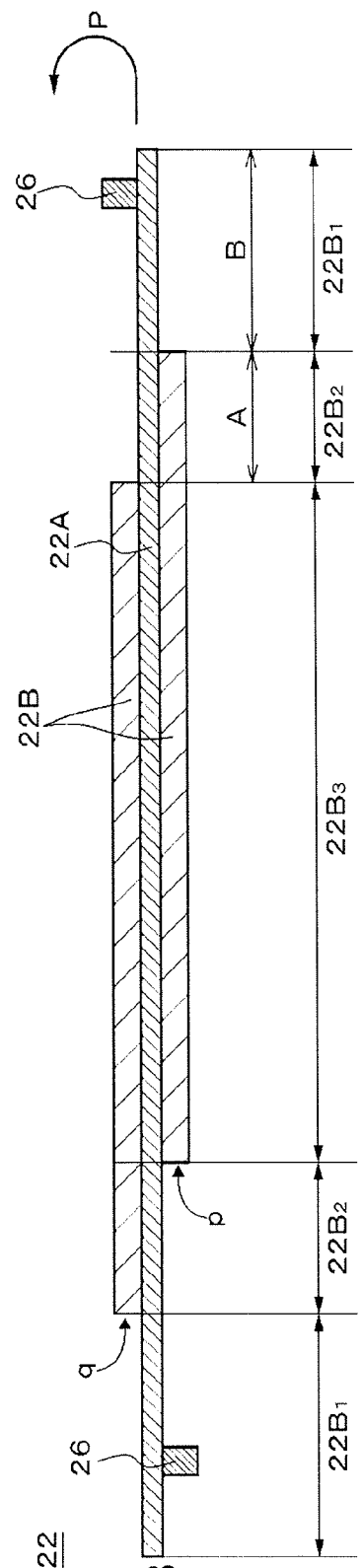
FIG. 4A
FIG. 4B

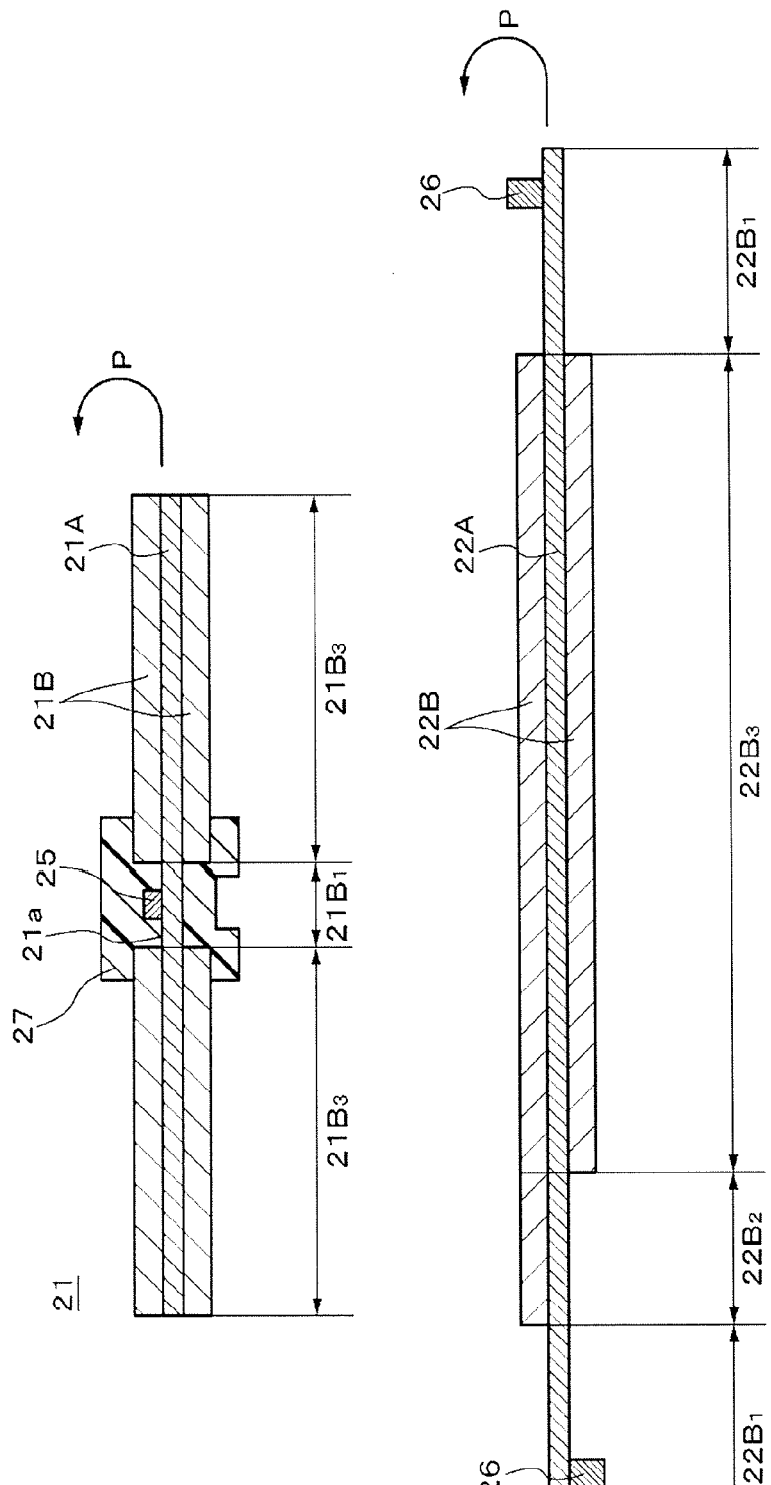

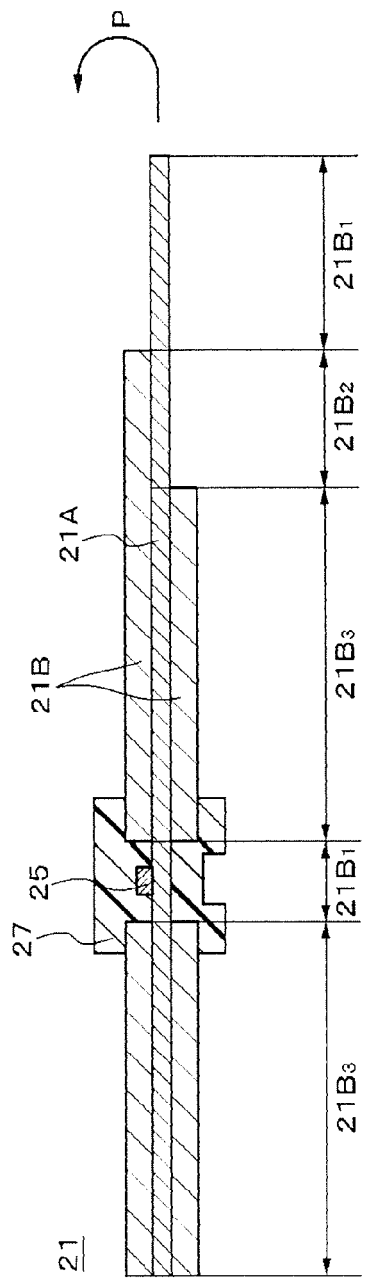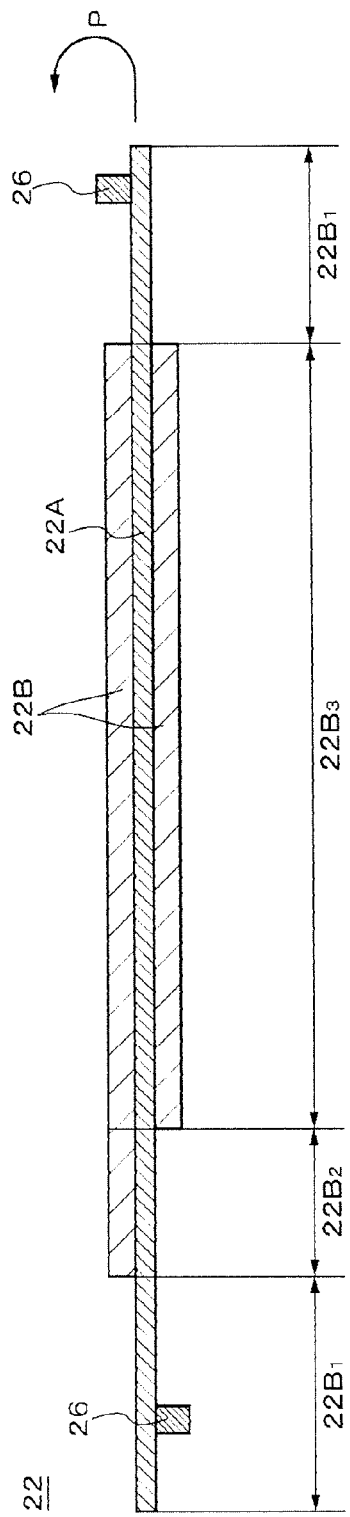

BATTERY, BATTERY PACK, ELECTRONIC APPARATUS, ELECTRIC VEHICLE, ELECTRIC POWER STORAGE APPARATUS, AND ELECTRIC POWER SYSTEM

CROSS REFERENCES TO RELATED APPLICATIONS

The present application claims priority to Japanese Priority Patent Application JP 2012-252200 filed in the Japan Patent Office on Nov. 16, 2012, the entire content of which is hereby incorporated by reference.

BACKGROUND

The present application relates to a battery, a battery pack, an electronic apparatus, an electric vehicle, an electric power storage apparatus, and an electric power system.

A battery using a non-aqueous electrolytic solution, in particular, a lithium ion secondary battery provides higher energy density compared to lead batteries and nickel-cadmium batteries that are existing secondary batteries using aqueous electrolytic solutions. Therefore, the expectation degree of the lithium ion secondary battery has been increased, and the market has been significantly grown. In particular, in recent years, since characteristics of the lithium ion secondary battery such as light weight and high energy density are suitable for an electric automobile and a hybrid electric automobile, studies aiming at growing the lithium ion secondary battery in size and achieving high output thereof have been actively made.

In particular, in order to use a cell with higher output, it has been proposed to adopt a structure in which a mixture layer is formed on both sides of a cathode lead. Thereby, it becomes possible to decrease cell resistance and to obtain a specialized cell for high output.

In Japanese Unexamined Patent Application Publication Nos. H4-12471 (JP H4-12471A), H10-79245 (JP H10-79245A), H11-329408 (JP H11-329408A), H10-228930 (JP H10-228930A), 2007-305598 (JP2007-305598A), 2008-234855 (JP2008-234855A), 2001-110453 (JP2001-110453A), 2000-195556 (JP2000-195556A), and 2001-351610 (JP2001-351610A), technologies of configurations of electrodes and the like are disclosed.

SUMMARY

Batteries desirably have favorable cycle characteristics.

It is desirable to provide a battery, a battery pack, an electronic apparatus, an electric vehicle, an electric power storage apparatus, and an electric power system that are capable of providing favorable cycle characteristics.

According to an embodiment of the present application, there is provided a battery including a spirally wound electrode body, the spirally wound electrode body including a cathode and an anode that are spirally wound, wherein the anode includes: an anode double side coating section where an anode mixture layer is formed on both main surfaces of an anode current collector; a first anode single-side coating section where the anode mixture layer is formed only on a first main surface located on an outer circumference side out of both the main surfaces of the anode current collector; and an anode double side non-coating section where both surfaces of the anode current collector are exposed, the anode double side non-coating section, the first anode single-side coating section, and the anode double side coating section are provided in this order from a first end on the side of spiral winding start of the anode, and in an anode mixture layer on the first main surface side formed on the first main surface of the anode current collector, an area density ratio of the anode mixture layer on the first main surface side of the first anode single-side coating section is equal to or more than about 1.2, the area density ratio being expressed by a following expression,

[Expression]

Area density ratio of the anode mixture layer on the first main surface side=("Area density of the anode mixture layer on the first main surface side of the first anode single-side coating section")/("Area density of the anode mixture layer on the first main surface side of sections other than the first anode single-side coating section").

According to an embodiment of the present application, there is provided a battery pack provided with a battery, a control section configured to control the battery, and an outer package containing the battery, the battery including: a spirally wound electrode body, the spirally wound electrode body including a cathode and an anode that are spirally wound, wherein the anode includes: an anode double side coating section where an anode mixture layer is formed on both main surfaces of an anode current collector; a first anode single-side coating section where the anode mixture layer is formed only on a first main surface located on an outer circumference side out of both the main surfaces of the anode current collector; and an anode double side non-coating section where both surfaces of the anode current collector are exposed, the anode double side non-coating section, the first anode single-side coating section, and the anode double side coating section are provided in this order from a first end on the side of spiral winding start of the anode, and in an anode mixture layer on the first main surface side formed on the first main surface of the anode current collector, an area density ratio of the anode mixture layer on the first main surface side of the first anode single-side coating section is equal to or more than about 1.2, the area density ratio being expressed by a following expression,

[Expression]

Area density ratio of the anode mixture layer on the first main surface side=("Area density of the anode mixture layer on the first main surface side of the first anode single-side coating section")/("Area density of the anode mixture layer on the first main surface side of sections other than the first anode single-side coating section").

According to an embodiment of the present application, there is provided an electronic apparatus provided with a battery and configured to receive electric power from the battery, the battery including: a spirally wound electrode body, the spirally wound electrode body including a cathode and an anode that are spirally wound, wherein the anode includes: an anode double side coating section where an anode mixture layer is formed on both main surfaces of an anode current collector; a first anode single-side coating section where the anode mixture layer is formed only on a first main surface located on an outer circumference side out of both the main surfaces of the anode current collector; and an anode double side non-coating section where both surfaces of the anode current collector are exposed, the anode double side non-coating section, the first anode single-side coating section, and the anode double side coating section are provided in this order from a first end on the side of spiral winding start of the anode, and in an anode mixture layer on the first main surface side formed on the first main surface of the anode current collector, an area density ratio of the anode mixture layer on the first main surface side of the first anode single-side coating section is equal to or more than about 1.2, the area density ratio being expressed by a following expression,

[Expression]

Area density ratio of the anode mixture layer on the first main surface side=("Area density of the anode mixture layer on the first main surface side of the first anode single-side coating section")/("Area density of the anode mixture layer on the first main surface side of sections other than the first anode single-side coating section").

According to an embodiment of the present application, there is provided an electric vehicle provided with a battery, a conversion apparatus configured to convert electric power supplied from the battery into drive power of the vehicle, and a control apparatus configured to process information on vehicle control based on information on the battery, the battery including: a spirally wound electrode body, the spirally wound electrode body including a cathode and an anode that are spirally wound, wherein the anode includes: an anode double side coating section where an anode mixture layer is formed on both main surfaces of an anode current collector; a first anode single-side coating section where the anode mixture layer is formed only on a first main surface located on an outer circumference side out of both the main surfaces of the anode current collector; and an anode double side non-coating section where both surfaces of the anode current collector are exposed, the anode double side non-coating section, the first anode single-side coating section, and the anode double side coating section are provided in this order from a first end on the side of spiral winding start of the anode, and in an anode mixture layer on the first main surface side formed on the first main surface of the anode current collector, an area density ratio of the anode mixture layer on the first main surface side of the first anode single-side coating section is equal to or more than about 1.2, the area density ratio being expressed by a following expression,

[Expression]

Area density ratio of the anode mixture layer on the first main surface side=("Area density of the anode mixture layer on the first main surface side of the first anode single-side coating section")/("Area density of the anode mixture layer on the first main surface side of sections other than the first anode single-side coating section").

According to an embodiment of the present application, there is provided an electric power storage apparatus provided with a battery and configured to supply electric power to an electronic apparatus connected to the battery, the battery including: a spirally wound electrode body, the spirally wound electrode body including a cathode and an anode that are spirally wound, wherein the anode includes: an anode double side coating section where an anode mixture layer is formed on both main surfaces of an anode current collector; a first anode single-side coating section where the anode mixture layer is formed only on a first main surface located on an outer circumference side out of both the main surfaces of the anode current collector; and an anode double side non-coating section where both surfaces of the anode current collector are exposed, the anode double side non-coating section, the first anode single-side coating section, and the anode double side coating section are provided in this order from a first end on the side of spiral winding start of the anode, and in an anode mixture layer on the first main surface side formed on the first main surface of the anode current collector, an area density ratio of the anode mixture layer on the first main surface side of the first anode single-side coating section is equal to or more than about 1.2, the area density ratio being expressed by a following expression,

[Expression]

Area density ratio of the anode mixture layer on the first main surface side=("Area density of the anode mixture layer on the first main surface side of the first anode single-side coating section")/("Area density of the anode mixture layer on the first main surface side of sections other than the first anode single-side coating section").

According to an embodiment of the present application, there is provided an electric power system, the electric power system being configured to receive electric power from a battery, or in which the electric power is supplied from an electric power generating apparatus or an electric power network to the battery, the battery including: a spirally wound electrode body, the spirally wound electrode body including a cathode and an anode that are spirally wound, wherein the anode includes: an anode double side coating section where an anode mixture layer is formed on both main surfaces of an anode current collector; a first anode single-side coating section where the anode mixture layer is formed only on a first main surface located on an outer circumference side out of both the main surfaces of the anode current collector; and an anode double side non-coating section where both surfaces of the anode current collector are exposed, the anode double side non-coating section, the first anode single-side coating section, and the anode double side coating section are provided in this order from a first end on the side of spiral winding start of the anode, and in an anode mixture layer on the first main surface side formed on the first main surface of the anode current collector, an area density ratio of the anode mixture layer on the first main surface side of the first anode single-side coating section is equal to or more than about 1.2, the area density ratio being expressed by a following expression,

[Expression]

Area density ratio of the anode mixture layer on the first main surface side=("Area density of the anode mixture layer on the first main surface side of the first anode single-side coating section")/("Area density of the anode mixture layer on the first main surface side of sections other than the first anode single-side coating section").

In the embodiments of the technology, since the area density ratio of the anode mixture layer on the first main surface side of the first anode single-side coating section is equal to or more than 1.2, favorable cycle characteristics are obtainable.

According to the embodiments of the technology, favorable cycle characteristics are obtainable.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

FIG. 4A is a cross-sectional view illustrating a cross-sectional configuration of a cathode before spiral winding, and FIG. 4B is a cross-sectional view illustrating a cross-sectional configuration of an anode before the spiral winding.

FIG. 5A is a cross-sectional view illustrating a cross-sectional configuration of an existing cathode before spiral winding, and FIG. 5B is a cross-sectional view illustrating a cross-sectional configuration of an existing anode before the spiral winding.

FIG. 6A is a cross-sectional view illustrating a cross-sectional configuration of an existing cathode before spiral winding, and FIG. 6B is a cross-sectional view illustrating a cross-sectional configuration of an existing anode before the spiral winding.

DETAILED DESCRIPTION

Embodiments of the present application will be described below with reference to the drawings. The description will be given in the following order.
1. First Embodiment (an example of a cylindrical-type battery)
2. Second Embodiment (an example of a battery pack using the battery)
3. Third Embodiment (an example of an electric power storage system and the like using the battery)
4. Other Embodiments (modifications)

1. First Embodiment

Configuration of Battery

Figure 2:
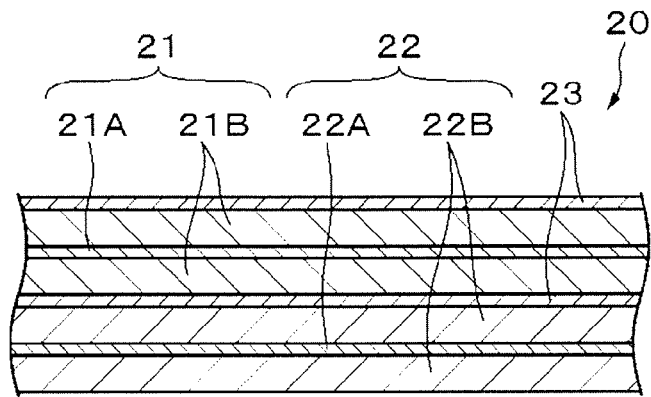
FIG. 2 is a cross-sectional view illustrating an enlarged part of a spirally wound electrode body illustrated in FIG. 1.
Figure 3:
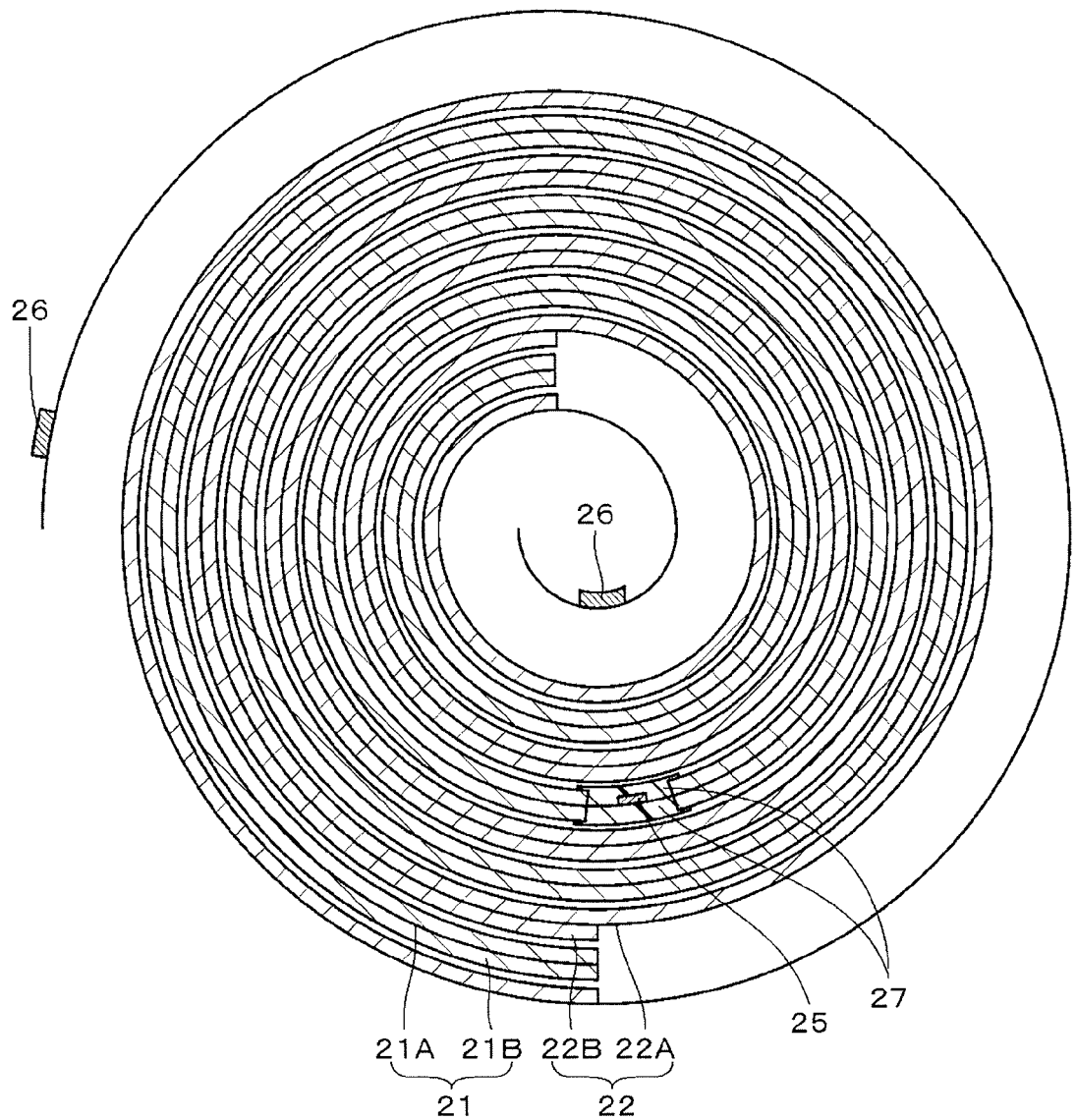
FIG. 3 is a cross-sectional view illustrating a spirally wound surface of the spirally wound electrode body.

A description will be given of a non-aqueous electrolyte battery according to a first embodiment of the present application referring to the drawings. FIG. illustrates a cross-sectional configuration of the non-aqueous electrolyte battery according to the first embodiment of the present application. FIG. 2 is a cross-sectional view illustrating enlarged part of a spirally wound electrode body 20 illustrated in FIG. 1. FIG. 3 is a cross-sectional view illustrating a spirally wound surface of the spirally wound electrode body. In FIG. 3, a separator is not illustrated.

The non-aqueous electrolyte battery may be, for example, a secondary battery capable of charged and discharged such as a lithium ion secondary battery in which a capacity of an anode 22 is expressed based on insertion and extraction of lithium as an electrode reactant.

Figure 1:
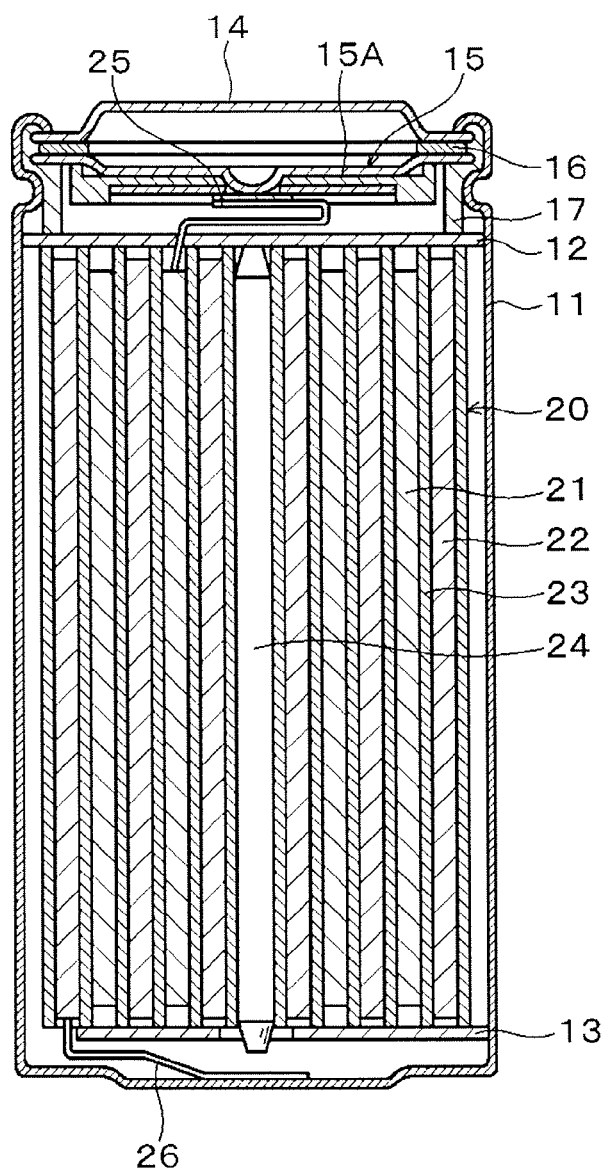
FIG. 1 is a cross-sectional view illustrating an example of a configuration of a non-aqueous electrolyte battery according to an embodiment of the present application.

As illustrated in FIG. 1, the non-aqueous electrolyte battery mainly contain the spirally wound electrode body 20 in which a cathode 21 and the anode 22 are layered with a separator 23 in between and are spirally wound; and a pair of insulating plates 12 and 13 inside a battery can 11 in the shape of a substantially-hollow cylinder. A battery structure using the cylindrical battery can 11 is called cylindrical type.

For example, the battery can 11 may have a hollow structure in which one end of the battery can 11 is closed and the other end of the battery can 11 is opened. The battery can 11 may be made of, for example, iron (Fe), aluminum (Al), an alloy thereof, or the like. It is to be noted that, in the case where the battery can 11 is made of iron, for example, the surface of the battery can 11 may be plated with nickel (Ni) or the like. The pair of insulating plates 12 and 13 is arranged to sandwich the spirally wound electrode body 20 in between, and to extend perpendicularly to the spirally wound circumference surface of the spirally wound electrode body 20.

At the open end of the battery can 11, a battery cover 14, a safety valve mechanism 15, and a positive temperature coefficient device (PTC device) 16 are attached by being swaged with a gasket 17. Thereby, the battery can 11 is hermetically sealed. The battery cover 14 may be made of, for example, a material similar to that of the battery can 11. The safety valve mechanism 15 and the PTC device 16 are provided inside the battery cover 14. The safety valve mechanism 15 is electrically connected to the battery cover 14 through the PTC device 16. In the safety valve mechanism 15, in the case where the internal pressure becomes a certain level or more by internal short circuit, external heating, or the like, a disk plate 15A inverts to cut electric connection between the battery cover 14 and the spirally wound electrode body 20. The PTC device 16 prevents abnormal heat generation resulting from a large current by increasing resistance (limiting a current) with a rise in temperature. The gasket 17 may be made of, for example, an insulating material. The surface of the gasket 17 may be coated with, for example, asphalt.

As illustrated in FIG. 2 and FIG. 3, the spirally wound electrode body 20 is obtained by layering the strip-shaped cathode 21 and the strip-shaped anode 22 with the separator 23 in between and spirally winding the resultant laminated body.

In the center of the spirally wound electrode body 20, a center pin 24 is inserted. In the spirally wound electrode body 20, a lead 25 made of aluminum or the like is connected to the cathode 21, and a lead 26 made of nickel or the like is connected to the anode 22. The lead 25 is attached to the safety valve mechanism 15 by welding or the like, and thereby, is electrically connected to the battery cover 14. The lead 26 is attached to the battery can 11 by welding or the like, and thereby, is electrically connected to the battery can 11. In FIG. 1, the lead 26 on the side of spiral winding start of the spirally wound electrode body 20 in FIG. 3 is not illustrated.

Configurations of Cathode and Anode

FIG. 4A is a cross-sectional view illustrating a cross-sectional configuration of the cathode before spiral winding. FIG. 4B is a cross-sectional view illustrating a cross-sectional configuration of the anode before spiral winding. It is to be noted that the spirally wound electrode body 20 is obtainable by spirally winding the cathode and the anode in a direction of an arrow P from each of electrode ends on each of the right sides of the figures.

Cathode

As illustrated in FIG. 4A, in the cathode 21, a double side coating section $21B_3$ where a cathode mixture layer 21B is formed on both main surfaces of a cathode current collector 21A; a double side non-coating section $21B_1$ where the cathode mixture layer 21B is not formed on either of the main surfaces of the cathode current collector 21A, and both the main surfaces of the cathode current collector 21A are exposed; and the double side coating section 21B₃ where the cathode mixture layer 21B is formed on both the main surfaces of the cathode current collector 21A are provided in this order from one end on the side of spiral winding start to the other end on the side of spiral winding end. The double side non-coating section 21B₁ is provided substantially in the center of the cathode 21 in a longitudinal direction.

In the double side non-coating section 21B₁, the lead 25 in the shape of, for example, a rectangle may be provided. The cathode 21 has a structure in which the cathode mixture layer 21B is arranged on the left side and the right side of the lead 25. The lead 25 may be joined to an exposed surface 21a on the other main surface side of the cathode current collector 21A by being welded with the use of, for example, ultrasonic welding or the like. It is to be noted that, in the spirally wound electrode body 20 after spiral winding, one main surface out of both the main surfaces of the cathode current collector 21A is located on the outer circumference side, and the other main surface thereof is located on the inner circumference side. The lead 25 may be joined to the exposed surface 21a on one main surface side instead of on the exposed surface 21a on the other main surface side of the cathode current collector 21A.

Protective Tape

A protective tape 27 covers the exposed surface 21a of the cathode current collector 21A on the one main surface side of the cathode current collector 21A, and covers the exposed surface 21a of the cathode current collector 21A and the lead 25 on the other main surface side of the cathode current collector 21A. The protective tape 27 may prevent thermo-runaway of the battery when, for example, the separator and/or the like is split at the time of disorder of the battery, and the cathode 21 is in contact with the anode 22. The protective tape 27 may be, for example, a resin tape or the like.

Cathode Current Collector

The cathode current collector 21A may be, for example, in a state of a foil, and may be made of, for example, a metal material such as aluminum, nickel, and stainless steel.

Cathode Mixture Layer

The cathode mixture layer 21B contains one or more of cathode materials capable of inserting and extracting lithium as cathode active materials. The cathode active material layer 21B may further contain other materials such as a binder and an electric conductor as necessary.

As a cathode material capable of inserting and extracting lithium, for example, a lithium-containing compound such as a lithium oxide, a lithium phosphorus oxide, a lithium nitride, and an interlayer compound containing lithium may be appropriate, and a mixture of two or more thereof may be used. In order to increase energy density, a lithium-containing compound containing lithium, a transition metal element, and oxygen (O) may be preferable. Examples of such a lithium-containing compound may include a lithium composite oxide having a bedded salt structure represented by Formula (1) and a lithium composite phosphate having an olivine structure represented by Formula (2). As a lithium-containing compound, a compound containing one or more elements selected from the group including cobalt (Co), nickel (Ni), manganese (Mn), and iron (Fe) as transition metal elements may be more preferable. Examples of such a lithium-containing compound may include a lithium composite oxide having a bedded salt structure represented by any of Formula (3), Formula (4), and Formula (5), a lithium composite oxide having a spinel structure represented by Formula (6), and a lithium composite phosphate having an olivine structure represented by Formula (7). Specific examples thereof may include one or more of $LiNi_{x1}Co_{y1}M_{z1}O_2$ (in the formula, M is one or more of Al and transition metals (excluding Ni and Co); x1 satisfies 0<x1<1, y1 satisfies 0<y1<1, z1 satisfies 0<z1<1, and x1, y1, and z1 satisfy x1+y1+z1=1), $LiNi_{0.50}Co_{0.20}Mn_{0.30}O_2$, $Li_aCoO_2$ (a≈1), $Li_bNiO_2$ (b≈1), $Li_{c1}Ni_{c2}CO_{1-c2}O_2$ (c≈1, 0<c2<1), $Li_dMn_2O_4$ (d≈1), and $Li_eFePO_4$ (e≈1).

$$Li_pNi_{(1-q-r)}Mn_qM1_rO_{(2-y)}X_z \quad (1)$$

In the formula, M1 represents one or more elements selected from the group including Group 2 elements to Group 15 elements excluding nickel (Ni) and manganese (Mn); X represents one or more elements selected from the group including Group 16 elements and Group 17 elements excluding oxygen (O); and p, q, r, y, and z are values in the ranges of 0≤p≤1.5, 0≤q≤1.0, 0≤r≤1.0, −0.10≤y≤0.20, and 0≤z≤0.2.

$$Li_aM2_bPO_4 \quad (2)$$

In the formula, M2 represents one or more elements selected from the group including Group 2 elements to Group 15 elements; and a and b are values in the ranges of 0≤a≤2.0 and 0.5≤z≤2.0.

$$Li_fMn_{(1-g-h)}Ni_gM3_hO_{(2-j)}F_k \quad (3)$$

In the formula, M3 represents one or more elements selected from the group including cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W); and f, g, h, j, and k are values in the ranges of 0.8≤f≤1.2, 0≤g≤0.5, 0≤h≤0.5, g+h≤1, −0.1≤j≤0.2, and 0≤k≤0.1. It is to be noted that a lithium composition varies according to a charge-discharge state, and a value of f represents a value in a completely-discharged state.

$$Li_mNi_{(1-n)}M4_nO_{(2-p)}F_q \quad (4)$$

In the formula, M4 represents one or more elements selected from the group including cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); and m, n, p, and q are values in the ranges of 0.8≤m≤1.2, 0.005≤n≤0.5, −0.1≤p≤0.2, and 0≤q≤0.1. It is to be noted that a lithium composition varies according to a charge-discharge state, and a value of m represents a value in a completely-discharged state.

$$Li_rCo_{(1-s)}M5_sO_{(2-t)}F_u \quad (5)$$

In the formula, M5 represents one or more elements selected from the group including nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); and r, s, t, and u are values in the ranges of 0.8≤r≤1.2, 0≤s≤0.5, −0.1≤t≤0.2, and 0≤u≤0.1. It is to be noted that a lithium composition varies according to a charge-discharge state, and a value of r represents a value in a completely-discharged state.

$$Li_vMn_{2-w}M6_wO_xF_y \quad (6)$$

In the formula, M6 represents one or more elements selected from the group including cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); and v, w, x, and y are values in the ranges of $0.9 \leq v \leq 1.1$, $0 \leq w \leq 0.6$, $3.7 \leq x \leq 4.1$, and $0 \leq y \leq 0.1$. It is to be noted that a lithium composition varies according to a charge-discharge state, and a value of v represents a value in a completely-discharged state.

$$Li_zM7PO_4 \tag{7}$$

In the formula, M7 represents one or more elements selected from the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr); and z is a value in the range of $0.9 \leq z \leq 1.1$. It is to be noted that a lithium composition varies according to a charge-discharge state, and a value of z represents a value in a completely-discharged state.

In addition thereto, examples of the cathode material capable of inserting and extracting lithium may include an inorganic compound not containing lithium such as $MnO_2$, $V_2O_5$, $V_6O_{13}$, NiS, and Mos.

The cathode material capable of inserting and extracting lithium may be a material other than the foregoing examples. Further, a mixture of two or more of the foregoing exemplified cathode materials may be used as an arbitrary combination.

Binder

Examples of the binder may include synthetic rubbers such as a styrene-butadiene-based rubber, a fluorine-based rubber, and ethylene propylene diene; and polymer materials such as polyvinylidene fluoride. One thereof may be used singly, or a mixture of a plurality thereof may be used.

Electric Conductor

Examples of the electric conductor may include carbon materials such as graphite and carbon black. One thereof may be used singly, or a mixture of a plurality thereof may be used. The electric conductor may be a metal material, a conductive polymer, or the like as long as the material has electric conductivity.

Anode

As illustrated in FIG. 4B, in the anode 22, an anode mixture layer 22B is provided on each of one main surface and the other main surface of an anode current collector 22A. In the anode 22, the anode mixture layer 22B indicated by an arrow p is provided on the one main surface of the anode current collector 22A, and the anode mixture layer 22B indicated by an arrow q is provided on the other main surface of the anode current collector 22A. In the spirally wound electrode body 20 after spiral winding, the one main surface out of both the main surfaces of the anode current collector 22A is located on the outer circumference side, and the other main surface thereof is located on the inner circumference side.

The anode 22 has a double side non-coating section 22B$_1$ where the anode mixture layer 22B is not formed on either of the one main surface and the other main surface of the anode current collector 22A; and a single-side coating section 22B$_2$ where the anode mixture layer 22B is formed only on one of the one main surface and the other main surface of the anode current collector. Further, the anode 22 has a double side coating section 22B$_3$ where the anode mixture layer 22B is formed on both the main surfaces of the anode current collector 22A.

In the anode 22, the double side non-coating section 22B$_1$, the single-side coating section 22B$_2$, the double side coating section 22B$_3$, the single-side coating section 22B$_2$, and the double side non-coating section 22B$_1$ are provided in this order from one end on the side of spiral winding start to the other end on the side of spiral winding end. After the spiral winding, in the single-side coating section 22B$_2$ on the side of spiral winding start, the anode mixture layer 22B is formed only on the one main surface to become the outer circumference side out of both the main surfaces of the anode current collector 22A. In contrast, in the single-side coating section 22B$_2$ on the side of spiral winding end, the anode mixture layer 22B is formed only on the other main surface to become the inner circumference side out of both the main surfaces of the anode current collector 22A. In the double side non-coating section 22B$_1$ on the side of spiral winding start, the lead 26 is joined to the other main surface of the anode current collector 22A. In the double side non-coating section 22B$_1$ on the side of spiral winding end, the lead 26 is joined to the one main surface of the anode current collector 22A.

Area Density of Anode Mixture Layer

In the anode mixture layer 22B on the one main surface side indicated by the arrow p that is formed on the one main surface of the anode current collector 22A, an area density ratio (an area density ratio obtained by the following expression) of the anode mixture layer 22B on the one main surface side of the single-side coating section 22B$_2$ on the side of spiral winding start is equal to or more than 1.2, and may be preferably from 1.2 to 1.7 both inclusive.

[Expression]

"Area density ratio of the anode mixture layer 22B on the one main surface side of the single-side coating section 22B$_2$ on the side of spiral winding start"=("Area density of the anode mixture layer 22B on the one main surface side of the single-side coating section 22B$_2$ on the side of spiral winding start")/("Area density of the anode mixture layer 22B on the one main surface side of sections other than the single-side coating section 22B$_2$ on the side of spiral winding start")

In the case where the foregoing area density ratio of the single-side coating section 22B$_2$ on the side of spiral winding start is less than 1.2, an anode utilization ratio is not allowed to be decreased sufficiently in the single-side coating section 22B$_2$ on the side of spiral winding start as a section where the anode utilization ratio is the highest structurally, and cycle characteristics are lowered. In the case where the foregoing area density ratio of the single-side coating section 22B$_2$ on the side of spiral winding start is more than 1.7, the anode utilization ratio is allowed to be decreased sufficiently. However, in this case, a width of the spirally wound electrode body is increased, resulting in a disadvantage in view of energy density. Further, in this case, an extra amount of the active material is necessitated, and therefore, cost is increased. It is to be noted that the area density may be measured after, for example, once assembling a cell, charging the cell, discharging the cell until a voltage reaches 2.5 V, disassembling the cell, and subsequently impregnating the disassembled cell with a solvent such as DMC (dimethyl carbonate) for predetermined time (such as 30 minutes).

Width of Single-Side Coating Section on the Side of Spiral Winding Start

A width (a width A in FIG. 4B) of the single-side coating section 22B$_2$ on the side of spiral winding start may be preferably from 6 mm to 21 mm both inclusive. In the case where the width of the single-side coating section $22B_2$ on the side of spiral winding start is less than 6 mm, effect to prevent abnormal precipitation of Li on the electrode surface during cycles and/or the like is less likely to be obtained. In the case where the width of the single-side coating section $22B_2$ on the side of spiral winding start is more than 21 mm, the cathode mixture exists on a section opposed to the side where the anode mixture layer 22B of the single-side coating section $22B_2$ on the side of spiral winding start of the anode 22 is not formed. Therefore, in this case, at the time of cycles, in the single-side coating section $22B_2$ on the side of spiral winding start of the anode 22, it is possible that a metal such as Li is abnormally precipitated on the anode current collector 22A, leading to lowered safety.

Where the width of the single-side coating section $22B_2$ on the side of spiral winding start is A; a width (a width B in FIG. 4B) of the double side non-coating section $21B_1$ on the side of spiral winding start is B; and an innermost circumference diameter of the spirally wound electrode body 20 is M, $0.5M \leq A \leq 1.8M$ and $0.2M \leq B \leq 2.2M$ may be preferably satisfied. In the case where the foregoing conditions are not satisfied, at the time of winding up the electrode, electrode wrinkles may be generated in the double side non-coating section $21B_1$ on the side of spiral winding start and the single-side coating section $22B_2$ on the side of spiral winding start, winding gaps may be generated, and explosion, thermal runaway, and/or the like of the battery may occur during cycles. In the case where the foregoing conditions are satisfied, a battery in which electrode wrinkles, winding gaps, and the like are not generated is obtainable. It is to be noted that, in this example, the electrode wrinkles, the winding gaps, and the like are checked visually after disassembling a cell. Further, the innermost circumference diameter M of the spirally wound electrode body 20 is a value obtained by "a radius in a section where the diameter is the smallest on the side of spiral winding start×2×circular constant," and may be obtained, for example, by measurement with the use of a vernier caliper after disassembling a battery or by measuring a cross-sectional image of the spirally wound electrode body 20 by X-ray CT (Computed Tomography) scanning or the like.

The anode current collector 22A may be, for example, in a state of a foil, and may be made of a metal material such as copper, nickel, and stainless steel.

The anode mixture layer 22B contains one or more of anode materials capable of inserting and extracting lithium as anode active materials. The anode mixture layer 22B may further contain other materials such as a binder and an electric conductor as necessary.

In the anode mixture layer 22B, for example, in order to prevent lithium metal from being unintentionally precipitated at the time of charge and discharge, a chargeable capacity of the anode material may be preferably larger than a chargeable capacity of the cathode 21. It is to be noted that a binder and an electric conductor similar to those described in the cathode 21 may be used.

Examples of the anode materials capable of inserting and extracting lithium may include carbon materials. Examples of the carbon material may include non-graphitizable carbon, graphitizable carbon, artificial graphite such as MCMB (mesocarbon microbead), natural graphite, pyrolytic carbons, cokes, graphites, glassy carbons, an organic polymer compound fired body, carbon blacks, carbon fiber, and activated carbon. Examples of the cokes may include pitch coke, needle coke, and petroleum coke. The organic polymer compound fired body is obtained by firing and carbonizing a polymer material such as a phenol resin and a furan resin at appropriate temperature. Some of the organic polymer compound fired bodies are categorized into non-graphitizable carbon or graphitizable carbon.

In addition to the foregoing carbon materials, examples of the anode materials capable of inserting and extracting lithium may include a material that is capable of inserting and extracting lithium and that has one or more of metal elements and metalloid elements as constitutional elements, since high energy density is obtainable thereby. Such an anode material may be a simple substance, an alloy, or a compound of a metal element or a metalloid element, or may have one or more phases thereof in part or all thereof. It is to be noted that "alloy" in the embodiment of the present application includes a material containing one or more metal elements and one or more metalloid elements, in addition to a material including two or more metal elements. Further, the "alloy" may contain a nonmetallic element. Examples of the structure thereof may include a solid solution, a eutectic crystal (eutectic mixture), an intermetallic compound, and a structure in which two or more thereof coexist.

Examples of the foregoing metal elements and the foregoing metalloid elements may include metal elements and metalloid elements that are capable of forming an alloy with lithium. Specific examples thereof may include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). In particular, silicon, tin, or both may be preferable, and silicon may be more preferable. One reason for this is that silicon and tin have a superior ability of inserting and extracting lithium, and therefore, provide high energy density.

Examples of an anode material containing silicon, tin, or both may include any of a simple substance, an alloy, and a compound of silicon; any of a simple substance, an alloy, and a compound of tin; and a material having one or more phases thereof in part or all thereof.

Examples of the alloys of silicon may include an alloy containing one or more elements selected from the group including tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as a second constituent element other than silicon. Examples of the alloys of tin may include an alloy containing one or more elements selected from the group including silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as a second constituent element other than tin (Sn).

Examples of the compounds of tin and examples of the compounds of silicon may include a compound containing oxygen (O) or carbon (C). Any of the compounds of tin and the compounds of silicon may contain the foregoing second constitutional element in addition to tin (Sn) or silicon (Si).

In particular, as the anode material containing silicon (Si), tin (Sn), or both, for example, a material containing a second constituent element and a third constituent element in addition to tin (Sn) as a first constituent element may be preferable. It goes without saying that such an anode material may be used together with any of the foregoing anode materials. Examples of the second constituent element may include one or more elements selected from the group including cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cerium (Ce), hafnium (Hf), tantalum (Ta), tungsten (W), bismuth (Bi), and silicon (Si). Examples of the third constituent element may include one or more elements selected from the group including boron (B), carbon (C), aluminum (Al), and phosphorus (P). In the case where the second constituent element and the third constituent element are contained, cycle characteristics are improved.

In particular, an SnCoC-containing material containing tin (Sn), cobalt (Co), and carbon (C) as constituent elements may be preferable. The composition of the SnCoC-containing material may be, for example, as follows. That is, the content of carbon (C) may be from 9.9 mass % to 29.7 mass % both inclusive, and the ratio of cobalt (Co) with respect to the sum of tin (Sn) and cobalt (Co) (Co/($Sn^+$ Co)) may be in the range from 30 mass % to 70 mass % both inclusive. In such a composition range, high energy density is obtained, and superior cycle characteristics are obtained.

The SnCoC-containing material may further contain other element as necessary. As such other element, for example, silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga), bismuth (Bi), or the like may be preferable. The SnCoC-containing material may contain one or more of these elements, since capacity characteristics or cycle characteristics are further improved thereby.

The SnCoC-containing material has a phase containing silicon (Sn), cobalt (Co), and carbon (C). Such a phase may preferably have a low-crystalline structure or an amorphous structure. Further, in the SnCoC-containing material, part or all of carbon as a constitutional element may be preferably bonded to one of a metal element and a metalloid element as constitutional elements. One reason for this is as follows. Cycle characteristics may be lowered by cohesion or crystallization of tin (Sn) and/or the like. Such cohesion or such crystallization is suppressed by bonding carbon to other element.

Examples of a measurement method for examining a bonding state of elements may include an X-ray photoelectron spectroscopy method (XPS). In the XPS, in an apparatus in which energy calibration is made so that the peak of 4f orbit of gold atom (Au4f) is obtained in 84.0 eV, the peak of is orbit of carbon (C1s) is shown in 284.5 eV in the case of graphite, and the peak of 1s orbit of carbon (C1s) is shown in 284.8 eV in the case of surface contamination carbon. In contrast, in the case where electric charge density of carbon element is high, for example, when carbon is bonded to a metal element or a metalloid element, the peak of C1s is shown in a region lower than 284.5 eV. That is, in the case where the peak of synthetic wave of C1s obtained for the SnCoC-containing material is shown in a region lower than 284.5 eV, part or all of carbon (C) contained in the SnCoC-containing material is bonded to one of a metal element and a metalloid element as other constitutional elements.

It is to be noted that, in the XPS, for example, the peak of C1s may be used for calibration of an energy axis of spectrum. In general, since surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of carbon in the SnCoC-containing material. Therefore, for example, analysis may be made with the use of commercially-available software to isolate the peak of the surface contamination carbon from the peak of carbon in the SnCoC-containing material. In the waveform analysis, the position of the main peak existing on the lowest bound energy side is the energy standard (284.8 eV).

Further, examples of the anode materials capable of inserting and extracting lithium may include a metal oxide, a polymer compound, and the like that are capable of inserting and extracting lithium. Examples of the metal oxide may include lithium titanate ($Li_4Ti_5O_{12}$), iron oxide, ruthenium oxide, and molybdenum oxide. Examples of the polymer compound may include polyacetylene, polyaniline, and polypyrrole.

It is to be noted that the anode material capable of inserting and extracting lithium may be a material other than the foregoing materials. Further, a mixture of two or more of the foregoing anode materials may be used with an arbitrary combination.

The anode mixture layer 22B may be formed by, for example, any of a vapor-phase deposition method, a liquid-phase deposition method, a spraying method, a firing method, and a coating method, and a combination of two or more thereof may be used. In the case where the anode active material layer 22B is formed by any of a vapor-phase deposition method, a liquid-phase deposition method, a spraying method, a firing method, and a combination of two or more thereof, part or all of an interface between the anode active material layer 22B and the anode current collector 22A may be preferably alloyed. Specifically, in the interface, constitutional elements of the anode current collector 22A may be preferably diffused into the anode active material layer 22B, constitutional elements of the anode active material layer 22B may be preferably diffused into the anode current collector 22A, or the constitutional elements of the anode current collector 22A and the anode active material layer 22B may be preferably diffused into each other. One reason for this is that, breakage due to expansion and shrinkage of the anode active material layer 22B associated with charge and discharge is allowed to be suppressed thereby, and electron conductivity between the anode active material layer 22B and the anode current collector 22A is allowed to be improved.

Examples of the vapor-phase deposition method may include a physical deposition method and a chemical deposition method. More specifically, examples thereof may include a vacuum evaporation method, a sputtering method, an ion plating method, a laser ablation method, a thermal chemical vapor deposition (CVD) method, and a plasma chemical vapor deposition method. Examples of the liquid-phase deposition method may include known methods such as an electrolytic plating method and an electroless plating method. The firing method may be, for example, a method in which a particulate anode active material mixed with a binder and/or the like is dispersed in a solvent, the anode current collector 22A is subsequently coated the resultant, heat treatment is performed at temperature higher than the melting point of the binder and/or the like. As the firing method, a known method may be utilized. Examples of the firing method may include an atmosphere firing method, a reactive firing method, and a hot press firing method.

Separator

The separator 23 separates the cathode 21 from the anode 22, and passes lithium ions while preventing current short circuit resulting from contact of both electrodes. The separator 23 may be, for example, a porous film made of a synthetic resin such as polytetrafluoroethylene, polypropylene, and polyethylene, a porous film made of ceramics, or the like. The separator 23 may be a laminated film in which two or more types of the porous films are laminated. The separator 23 is impregnated with an electrolytic solution as a liquid electrolyte.

Electrolytic Solution

The electrolytic solution is obtained by dissolving an electrolyte salt in a non-aqueous solvent. Ion conductivity is shown by electrolytic dissociation of the electrolyte salt. The separator 23 is impregnated with the electrolytic solution. The electrolytic solution is not particularly limited, and an existing non-aqueous solvent-based electrolytic solution or the like may be used.

Electrolyte Salt

Examples of the electrolyte salt may include lithium hexafluorophosphate ($LiPF_6$), bis(pentafluoroethanesulfonyl)imide lithium ($Li(C_2F_5SO_2)_2N$), lithium perchlorate ($LiClO_4$), lithium hexafluoroarsenate ($LiAsF_6$), lithium tetrafluoroborate ($LiBF_4$), lithium trifluoromethane sulfonate ($LiSO_3CF_3$), bis(trifluoromethanesulfonyl)imide lithium ($Li(CF_3SO_2)_2N$), tris(trifluoromethanesulfonyl)methyl lithium ($LiC(SO_2CF_3)_3$), lithium chloride (LiCl), lithium bromide (LiBr), $LiB(C_6H_5)_4$, $LiCH_3SO_3$, $LiCF_3SO_3$, $LiN(SO_2CF_3)_2$, $LiAlCl_4$, $LiSiF_6$, difluoro[oxalate-O,O']lithium borate, and lithium bis oxalate borate. In particular, $LiPF_6$ may be preferable, since high ion conductivity is obtainable thereby, and cycle characteristics are allowed to be improved thereby. Any electrolyte salt selected from the foregoing examples may be used singly, or a mixture of a plurality thereof may be used.

Non-Aqueous Solvent

Examples of the nonaqueous solvents in which the electrolyte salt is dissolved may include ethylene carbonate, propylene carbonate, butylene carbonate, vinylene carbonate, dimethyl carbonate, diethyl carbonate, ethyl methyl carbonate, 4-fluoro-1,3-dioxolane-2-one, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, ethyl propionate, acetonitrile, glutaronitrile, adiponitrile, methoxyacetonitrile, 3-methoxypropionitrile, N,N-dimethylformamide, N-methylpyrrolidinone, N-methyloxazolidinone, nitromethane, nitroethane, sulfolane, dimethyl sulfoxide, trimethyl phosphate, triethyl phosphate, ethylene sulfite, an ambient temperature molten salt such as bistrifluororomethylsulfonylimide and trimethylhexyl ammonium. In particular, ethylene carbonate, propylene carbonate, vinylene carbonate, 4-fluoro-1,3-dioxolane-2-one, dimethyl carbonate, ethyl methyl carbonate, and ethylene sulfite may be preferable, since superior charge-discharge capacity characteristics and superior charge-discharge cycle characteristics are obtainable thereby. Any of the solvents may be used singly, or a mixture of a plurality thereof may be used.

Method of Manufacturing Battery

The non-aqueous electrolyte battery may be manufactured, for example, by the following manufacturing method.

Manufacture of Cathode

First, the cathode 21 is fabricated. First, a cathode active material, a binder, and an electric conductor are mixed to prepare a cathode mixture. Thereafter, the cathode mixture is dispersed in an organic solvent to obtain paste cathode mixture slurry. Subsequently, predetermined regions of both the main surfaces of the cathode current collector 21A are uniformly coated with the cathode mixture slurry by a doctor blade, a bar coater, or the like, and the resultant is dried. Finally, the resultant is compression-molded by a roll pressing machine and/or the like while heating as necessary to form the cathode mixture layer 21B. In this case, compression-molding may be repeated several times.

Manufacture of Anode

Next, the anode 22 is fabricated. First, an anode material, a binder, and an electric conductor as necessary are mixed to prepare an anode mixture. Thereafter, the anode mixture is dispersed in an organic solvent to obtain paste anode mixture slurry. Subsequently, predetermined regions of both the main surfaces of the anode current collector 22A are uniformly coated with the anode mixture slurry by a doctor blade, a bar coater, or the like, and the resultant is dried. Finally, the resultant coating film is compression-molded by a roll pressing machine and/or the like while heating as necessary to form the anode mixture layer 22B.

It is to be noted that the anode 22 may be manufactured as follows. First, the anode current collector 22A made of an electrolytic copper foil or the like is prepared. Thereafter, an anode material is deposited on both surfaces of the anode current collector 22A by a vapor-phase deposition method such as an evaporation method to form a plurality of anode active material particles. Thereafter, as necessary, an oxide-containing film is formed by a liquid-phase deposition method such as a liquid-phase precipitation method, or a metal material is formed by a liquid-phase deposition method such as an electrolytic plating method, or both the oxide-containing film and the metal material are formed, and thereby, the anode mixture layer 22B is formed.

Assembly of Battery

The non-aqueous electrolyte battery is assembled as follows. First, the lead 25 is attached to the cathode current collector 21A by welding and/or the like, and the lead 26 is attached to the anode current collector 22A by welding and/or the like. Further, the protective tape 27 is provided in a predetermined position.

Subsequently, the cathode 21 and the anode 22 are layered with the separator 23 in between and are spirally wound, and the spirally wound electrode body 20 is thereby fabricated. Thereafter, the center pin 24 is inserted in the center of the spirally wound electrode body. Subsequently, the spirally wound electrode body 20 is sandwiched between the pair of insulating plates 12 and 13, and is contained in the battery can 11. The end tip of the lead 25 is attached to the safety valve mechanism 15 by welding, and the end tip of the lead 26 is attached to the battery can 11 by welding.

Subsequently, the foregoing electrolytic solution is injected into the battery can 11, and the separator 23 is impregnated with the electrolytic solution. Finally, at the open end of the battery can 11, the battery cover 14, the safety valve mechanism 15, and the PTC device 16 are fixed by being swaged with the gasket 17. The non-aqueous electrolyte battery is completed thereby.

Effect of Embodiment of Present Application and Comparison to Existing Technologies In the first embodiment of the present application described above, by decreasing an anode utilization ratio of the single-side coating section $22B_2$ on the side of spiral winding start of the anode 22, abnormal precipitation of lithium on the electrode surface during cycles is allowed to be prevented, and favorable cycle characteristics are obtainable.

In order to increase a capacity of a cell, it is necessary to fill in a larger amount of cathode active material in a predetermined space. Further, it is necessary to increase the anode utilization ratio in order to improve energy density. However, in a spirally wound structure, a single-side coating section on the side of spiral winding start of the anode is a section where the anode utilization ratio is the highest structurally. Therefore, in such a section, abnormal precipitation of lithium on the electrode surface during cycles and the like may occur. In contrast, in the embodiment of the present application, by decreasing the anode utilization ratio of the single-side coating section on the side of spiral winding start of the anode, abnormal precipitation of lithium on the electrode surface during cycles and the like are suppressed. As a result, favorable cycle characteristics are obtainable.

In contrast, in JP H4-12471A described in BACKGROUND, a difference between a thickness (active material amount) on the inner circumference side of an electrode plate and a thickness (active material amount) on the outer circumference side of the electrode plate is mentioned. However, in JP H4-12471A, no description is given of a fact that the active material amount is changed in a longitudinal direction on one main surface side of the electrode plate, differently from in the embodiment of the present application. For example, in JP H10-79245A, although a structure in which one or more ends of a rectangular electrode plate are thick (an active material amount is large) is mentioned, no description is given of an optimal opposite arrangement structure of a cathode and an anode, differently from in the embodiment of the present application. For example, in JP H11-329408A, although a ratio between a coating length and a non-coating length is mentioned, no description is given of the optimal opposite arrangement structure of the cathode and the anode described in the embodiment of the present application. For example, in JP H10-228930A and JP2007-305598A, although an electrode plate having a gap between a coating end of the front surface and a coating end of the rear surface is mentioned, no description is given of the optimal opposite arrangement structure of the cathode and the anode described in the embodiment of the present application. For example, in JP2008-234855A, although a structure having a lead in the vicinity of a middle portion of a cathode plate is mentioned, no description is given of the optimal opposite arrangement structure of the cathode and the anode described in the embodiment of the present application. For example, in JP2001-110453A, although a description is given of a structure in which a cathode current collector tub is located in a substantially intermediate portion between anode current collector tubs (two pieces), being equally distanced from the anode current collector tubs, no description is given of a relation between area density and cycle characteristics, differently from in the embodiment of the present application. For example, in JP2000-195556A, although a description is given of a structure in which one or more circuits of a single-side coating section (mixture density of the single-side coating section is 0.7 to 0.96 times as many as that of other sections, and a mixture weight thereof is the same as those of other sections) exist in an anode outermost circumference section, the location of the single-side coating is different from that of the embodiment of the present application, and functions and effects thereof are also different from those of the embodiment of the present application. For example, in JP2001-351610A, a description is given of a fact that a location where coating of a surface B is started is detached 3 mm or more from an end where coating of a surface A is finished, and thereby, generation of a projecting portion is suppressed. Further, in JP2001-351610A, although a description is given of a fact that a coating thickness varies according to change of a gap between a coating head and an electrode plate, no description is given of a relation among a battery structure, area density, and cycle characteristics, differently from in the embodiment of the present application.

Further, the configuration example of the electrode according to the embodiment of the present application is different from a configuration of existing electrodes described below. FIG. 5A is a cross-sectional view illustrating a cross-sectional configuration of an existing cathode before spiral winding. FIG. 5B is a cross-sectional view illustrating a cross-sectional configuration of an existing anode before the spiral winding. In the existing electrodes, the configuration of the cathode 21 is similar to that of the embodiment of the present application, while the configuration of the anode 22 is different from that of the embodiment of the present application. That is, in the existing anode 22, the double side non-coating section $22B_1$ and the double side coating section $22B_3$ are provided in this order from one end on the side of spiral winding start. Differently from in the anode 22 according to the embodiment of the present application, the single-side coating section $22B_2$ is not provided between the double side coating section $22B_3$ located in the center of the anode 22 and the double side non-coating section $22B_1$ located on the side of spiral winding start.

In the electrode configurations illustrated in FIG. 5A and FIG. 5B, in the double side coating section $22B_3$, part of the anode mixture layer 22B formed on one main surface of the anode current collector 22A becomes a useless portion not contributing to an electrode reaction, leading to lowered energy density.

FIG. 6A is a cross-sectional view illustrating a cross-sectional configuration of an existing cathode before spiral winding. FIG. 6B is a cross-sectional view illustrating a cross-sectional configuration of an existing anode before the spiral winding. In this example, the configurations of the cathode 21 and the anode 22 are different from those of the embodiment of the present application. That is, in the existing cathode 21, the double side non-coating section $21B_1$, the single-side coating section $21B_2$, the double side coating section $21B_3$, the double side non-coating section $21B_1$, and the double side coating section $21B_3$ are provided in this order from one end on the side of spiral winding start to the other end on the side of spiral winding end, differently from the configuration of the cathode 21 according to the embodiment of the present application. Further, in the existing anode 22, the double side non-coating section $22B_1$ and the double side coating section $22B_3$ are provided in this order from one end on the side of spiral winding start. Differently from in the anode 22 according to the embodiment of the present application, the single-side coating section $22B_2$ is not provided between the double side coating section $22B_3$ located in the center of the anode 22 and the double side non-coating section $22B_1$ located on the side of spiral winding start.

In the electrode configurations illustrated in FIG. 6A and FIG. 6B, in the double side coating section $22B_3$, part of the anode mixture layer 22B formed on one main surface of the anode current collector 22A becomes a useless portion not contributing to an electrode reaction, leading to lowered energy density.

2. Second Embodiment

Example of Battery Pack

Figure 7:
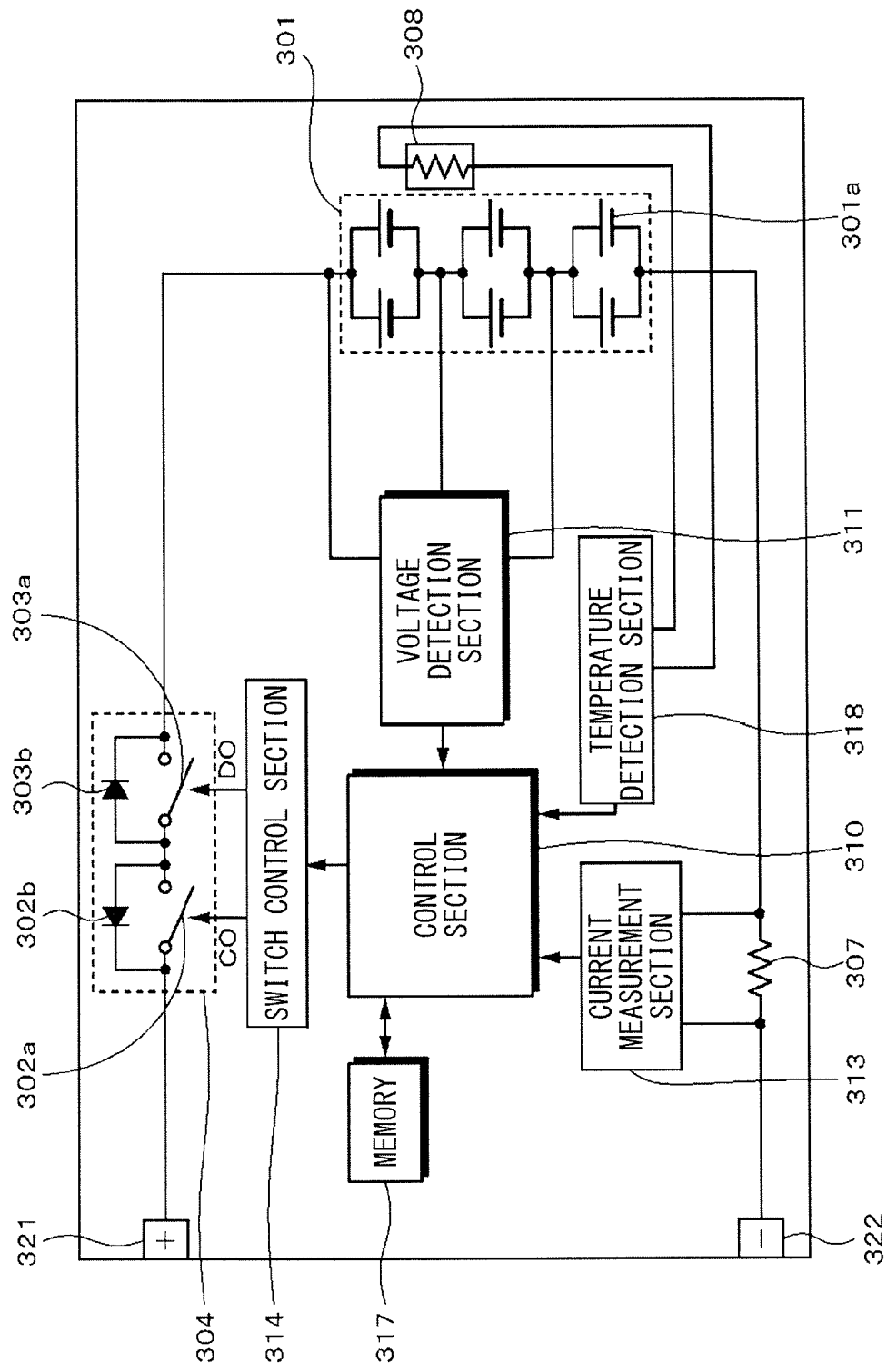
FIG. 7 is a block diagram illustrating an example of a configuration of a battery pack according to an embodiment of the present application.

FIG. 7 illustrates a block diagram illustrating an example of a circuit configuration when the non-aqueous electrolyte battery (referred to as "secondary battery" as appropriate below) according to the embodiment of the present application is applied to a battery pack. The battery pack includes an assembled battery 301, an outer package, a switch section 304 including a charge control switch 302a and discharge control switch 303a, a current detection resistance 307, a temperature detection device 308, and a control section 310.

Further, the battery pack includes a cathode terminal 321 and an anode terminal 322. At the time of charge, the cathode terminal 321 and the anode terminal 322 are connected to a cathode terminal and an anode terminal of a battery charger, and charge is performed thereby. In contrast, at the time of using an electronic apparatus, the cathode terminal 321 and the anode terminal 322 are connected to a cathode terminal and an anode terminal of the electronic apparatus, and discharge is performed thereby.

In the assembled battery 301, a plurality of secondary batteries 301a are connected in series and/or in parallel. Each of the secondary batteries 301a is the secondary battery according to the embodiment of the present application. In FIG. 7, a case in which six secondary batteries 301a are connected in a manner of dual-parallel and three-series (2P3S) is illustrated as an example. However, in addition thereto, any other connection method such as n-parallel and m-series (n and m are integer numbers) may be adopted.

The switch section 304 includes the charge control switch 302a, a diode 302b, the discharge control switch 303a, and a diode 303b, and is controlled by the control section 310. The diode 302b has polarity being in the direction opposite to a charge current flowing in a direction from the cathode terminal 321 to the assembled battery 301, and being in the forward direction with respect to a discharge current flowing in a direction from the anode terminal 322 to the assembled battery 301. The diode 303b has polarity being in the forward direction with respect to a charge current and being in the direction opposite to a discharge current. It is to be noted that, although in this example, the switch section is provided on the positive side, the switch section may be provided on the negative side.

When a battery voltage becomes an overcharge detection voltage, the charge control switch 302a is controlled to be turned off so that a charge current does not flow into a current path of the assembled battery 301 by a charge-discharge control section. After the charge control switch 302a is turned off, only discharge is enabled through the diode 302b. Further, when a large current flows at the time of discharge, the charge control switch 302a is controlled to be turned off so that a charge current flowing in the current path of the assembled battery 301 is blocked by the control section 310.

When a battery voltage becomes the overdischarge detection voltage, the discharge control switch 303a is controlled to be turned off so that a discharge current does not flow into a current path of the assembled battery 301 by the control section 310. After the discharge control switch 303a is turned off, only charge is enabled through the diode 303b. Further, when a large current flows at the time of discharge, the discharge control switch 303a is controlled to be turned off so that a discharge current flowing in the current path of the assembled battery 301 is blocked by the control section 310.

The temperature detection section 308 may be, for example, a thermistor. The temperature detection section 308 is provided in the vicinity of the assembled battery 301, measures temperature of the assembled battery 301, and supplies the measured temperature to the control section 310. The voltage detection section 311 measures a voltage of the assembled battery 301 and a voltage of each of the secondary batteries 301a, performs analog-to-digital conversion on the measured voltage, and supplies the resultant to the control section 310. The current measurement section 313 measures a current with the use of the current detection resistance 307, and supplies the measured current to the control section 310.

The switch control section 314 controls the charge control switch 302a and the discharge control switch 303a of the switch section 304 based on a voltage and a current inputted from the voltage detection section 311 and the current measurement section 313. In the case where any voltage of the secondary batteries 301a becomes equal to or less than the overcharge detection voltage or the overdischarge detection voltage, or in the case where a large current flows rapidly, the switch control section 314 sends a control signal to the switch section 304, and thereby, prevents overcharge, overdischarge, and overcurrent charge and discharge.

For example, in the case where the secondary battery is a lithium ion secondary battery, the overcharge detection voltage may be determined as, for example, 4.20±0.05 V, and the overdischarge detection voltage may be determined as, for example, 2.4±0.1 V.

As a charge-discharge switch, for example, a semiconductor switch such as a MOSFET may be used. In this case, a parasitic diode of the MOSFET functions as the diodes 302b and 303b. In the case where a P-channel FET is used as a charge-discharge switch, the switch control section 314 supplies control signals DO and CO to respective gates of the charge control switch 302a and the discharge control switch 303a. In the case of P-channel, the charge control switch 302a and the discharge control switch 303a are turned on by a gate electric potential lower than a source electric potential by a predetermined value or more. That is, in normal charge and discharge operations, the control signals DO and CO are set to low level, and the charge control switch 302a and the discharge control switch 303a are turned on.

For example, in the case of overcharge or overdischarge, the control signals CO and DO may be set to high level, and the charge control switch 302a and the discharge control switch 303a may be turned off.

The memory 317 may be a RAM or a ROM, and may be, for example, an EPROM (Erasable Programmable Read Only Memory) as a nonvolatile memory, or the like. The memory 317 previously stores numerical values calculated by the control section 310, internal resistance values and the like of the batteries in the initial state of the respective secondary batteries 301a measured in a manufacturing step, and the like, and may rewrite the values as appropriate. Further, by storing full charge capacities of the respective secondary batteries 301a in the memory 317, for example, a remaining capacity is allowed to be calculated together with the control section 310.

The temperature detection section 318 measures temperature with the use of the temperature detection device 308, controls charge and discharge at the time of abnormal heat generation, or performs correction at the time of calculation of a remaining capacity.

3. Third Embodiment

The foregoing non-aqueous electrolyte battery, and a battery pack, a battery unit, a battery module that use the same may be mounted onto an apparatus such as an electronic apparatus, an electric vehicle, and an electric power storage apparatus or may be used to supply electric power to such an apparatus.

Examples of the electronic apparatuses may include a notebook personal computer, a PDA (personal digital assistant), a mobile phone, a cordless handset, a video camcorder, a digital still camera, an electronic book, an electronic dictionary, a music player, a radio, a headphone, a game machine, a navigation system, a memory card, a pacemaker, a hearing aid, an electric power tool, an electric shaver, a refrigerator, an air conditioner, a television, a stereo, a water heater, a microwave oven, a dishwasher, a washing machine, a drying machine, a lamp, a toy, a medical apparatus, a robot, a load conditioner, and a traffic light.

Further, examples of the electric vehicle may include a railroad vehicle, a golf cart, an electric cart, and an electric automobile (including a hybrid automobile). The foregoing non-aqueous electrolyte battery, and a battery pack, a battery unit, a battery module that use the same may be used as a driving electric power source or an auxiliary electric power source for these electric vehicles.

Examples of the electric power storage apparatus may include an electric power source for electric power storage for a building such as a house or for a power-generating facility.

Out of the foregoing application examples, a description will be given below of specific examples of electric power storage systems each using an electric power storage apparatus to which the foregoing non-aqueous electrolyte battery according to the embodiment of the present application is applied.

Examples of configurations of the electric power storage systems may include the following systems. A first electric power storage system is an electric power storage system in which an electric power storage apparatus is charged by an electric power generating apparatus that generates electric power from renewable energy. A second electric power storage system is an electric power storage system having an electric power storage apparatus in which electric power is supplied to an electronic apparatus connected to the electric power storage apparatus. A third electric power storage system is an electronic apparatus supplied with electric power from an electric power storage apparatus. Each of these electric power storage systems is implemented as a system effectively supplying electric power in cooperation with an external electric power supply network.

Further, a fourth electric power storage system is an electric vehicle having a conversion apparatus that is supplied with electric power from an electric power storage apparatus and converts the electric power into drive power of the vehicle; and a control apparatus that performs information processing of vehicle control based on information on the electric power storage apparatus. A fifth electric power storage system is an electric power system that includes an electric power information transmitter/receiver section that transmits and receives a signal to and from other apparatus through a network, and that performs charge-discharge control of the foregoing electric power storage apparatus based on information received by the transmitter/receiver section. A sixth electric power storage system is an electric power system in which electric power is supplied from the foregoing electric power storage apparatus, and electric power is supplied from an electric power generating apparatus or an electric power network to the electric power storage apparatus.

3-1. Electric Power Storage System in Residence as Application Example

Figure 8:
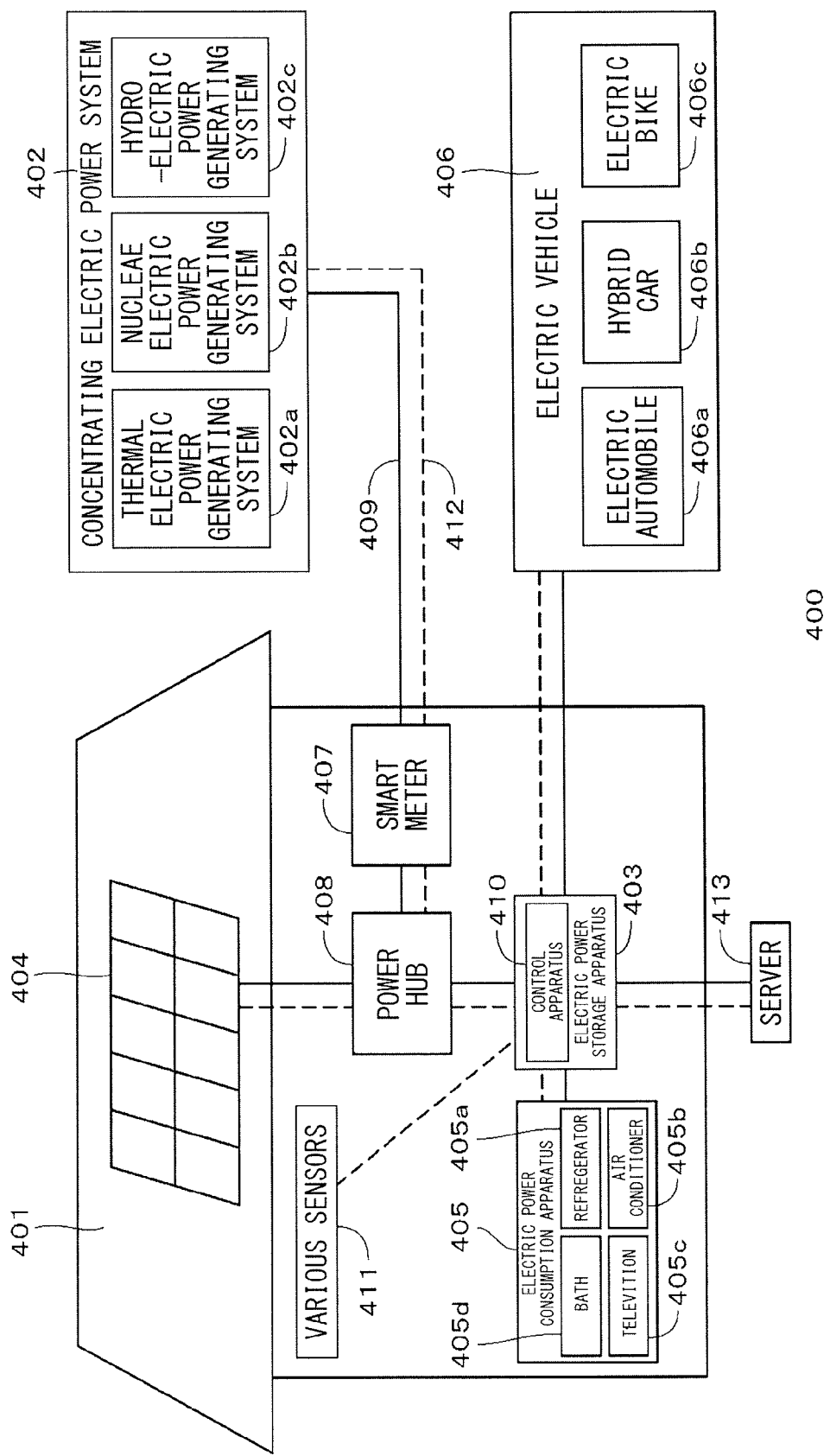
FIG. 8 is a schematic diagram illustrating an example in which the non-aqueous electrolyte battery according to the embodiment of the present application is applied to a residential electric power storage system.

A description will be given of an example in which an electric power storage apparatus using the non-aqueous electrolyte battery according to the embodiment of the present application is applied to an electric power storage system for a residence referring to FIG. 8. For example, in an electric power storage system 400 for a residence 401, electric power is supplied from a concentrated electric power system 402 such as a thermal electric power generating system 402a, a nuclear electric power generating system 402b, and a hydroelectric power generating system 402c to an electric power storage apparatus 403 through an electric power network 409, an information network 412, a smart meter 407, a power hub 408, and/or the like. In addition thereto, electric power is supplied from an independent electric power source such as a domestic power generating apparatus 404 to the electric power storage apparatus 403. The electric power supplied to the electric power storage apparatus 403 is stored. With the use of the electric power storage apparatus 403, electric power used in the residence 401 is supplied to the residence 401. A similar electric power storage system may be used not only in the residence 401 but also in other buildings.

The residence 401 is provided with the electric power generating apparatus 404, an electric power consumption apparatus 405, the electric power storage apparatus 403, a control apparatus 410 to control respective apparatuses, the smart meter 407, and a sensor 411 to acquire various information. The respective apparatuses are connected through the electric power network 409 and the information network 412. As the electric power generating apparatus 404, a solar battery, a fuel battery, and/or the like is used. Generated electric power is supplied to the electric power consumption apparatus 405 and/or the electric power storage apparatus 403. Examples of the electric power consumption apparatus 405 may include a refrigerator 405a, an air-conditioner 405b, a television 405c, and a bath 405d. Further, examples of the electric power consumption apparatus 405 may include an electric vehicle 406. Examples of the electric vehicle 406 may include an electric automobile 406a, a hybrid automobile 406b, and an electric motorcycle 406c.

The non-aqueous electrolyte battery according to the embodiment of the present application is applied to the electric power storage apparatus 403. The non-aqueous electrolyte battery according to the embodiment of the present application may be, for example, the foregoing lithium ion secondary battery. The smart meter 407 has a function to measure a used amount of commercial electric power and to send the measured used amount to an electric power company. The electric power network 409 may be one of direct-current power feeding, alternate-current power feeding, and noncontact power feeding, or a combination thereof.

Examples of the various sensors 411 may include a motion sensor, an illuminance sensor, an object sensor, an electric power consumption sensor, a vibration sensor, a contact sensor, a temperature sensor, and an infrared sensor. Information acquired from the various sensors 411 is sent to the control apparatus 410. Due to the information from the sensors 411, a weather state, a human state, and/or the like is perceived, the electric power consumption apparatus 405 is automatically controlled, and energy consumption is allowed to be minimized. Further, the control apparatus 410 is allowed to send information on the residence 401 to an external electric power company and/or the like through the Internet.

The power hub 408 performs a process such as branching of an electric power line and AC/DC conversion. Examples of a communication method of the information network 412 connected to the control apparatus 410 may include a method of using a communication interface such as a UART (Universal Asynchronous Receiver-Transceiver) and a method of utilizing a sensor network based on a wireless communication standard such as Bluetooth, ZigBee, and Wi-Fi. The Bluetooth method is applied to multimedia communication, and allows one-to-many communication. ZigBee uses IEEE (Institute of Electrical and Electronics Engineers) 802.15.4 physical layer. IEEE 802.15.4 is a name of a short-range wireless network standard called PAN (Personal Area Network) or W (Wireless) PAN.

The control apparatus 410 is connected to an external server 413. The server 413 may be managed by any of the residence 401, an electric power company, and a service provider. Examples of information that is sent from and is received by the server 413 may include consumer electric power information, life pattern information, an electric power fee, weather information, natural disaster information, and information on electric power transaction. Such information may be sent from or received by a domestic electric power consumption apparatus (such as a television), or may be sent from or received by an out-of-home apparatus (such as a mobile phone). Such information may be displayed on an apparatus having a display function such as a television, a mobile phone, and a PDA (Personal Digital Assistants).

The control apparatus 410 that controls respective parts is formed of a CPU (Central Processing Unit), a RAM (Random Access Memory), a ROM (Read Only Memory), and/or the like. In this example, the control apparatus 410 is stored in the electric power storage apparatus 403. The control apparatus 410 is connected to the electric power storage apparatus 403, the domestic electric power generating apparatus 404, the electric power consumption apparatus 405, the various sensors 411, and the server 413 through the information network 412. For example, the control apparatus 410 may have a function to adjust a used amount of commercial electric power and an electric-power-generating amount. It is to be noted that, in addition thereto, the control apparatus 410 may have a function to perform electric power transaction in the electric power market.

As described above, not only electric power generated by the concentrated electric power system 402 such as the thermal electric power generating system 402a, the nuclear electric power generating system 402b, and the hydroelectric power generating system 402c, but electric power generated by the domestic electric power generating apparatus 404 (solar power generation or wind power generation) is also allowed to be stored in the electric power storage apparatus 403. Therefore, even if electric power generated by the domestic electric power generating apparatus 404 is varied, control is allowed to be executed so that an electric power amount sent outside becomes constant, or electric discharge is performed as necessary. For example, electric power obtained by solar power generation may be stored in the electric power storage apparatus 403, while electric power in the middle of the night when an electric power fee is inexpensive may be stored in the electric power storage apparatus 403 and the electric power stored by the electric power storage apparatus 403 may be discharged and utilized during daytime hours when an electric power fee is expensive.

In this example, a description has been given of the example in which the control apparatus 410 is stored in the electric power storage apparatus 403. However, the control apparatus 410 may be stored in the smart meter 407, and may be configured by itself. Further, the electric power storage system 400 may be used for a plurality of households in a housing complex, or may be used for a plurality of single-family houses.

3-2. Electric Power Storage System in Vehicle as Application Example

Figure 9:
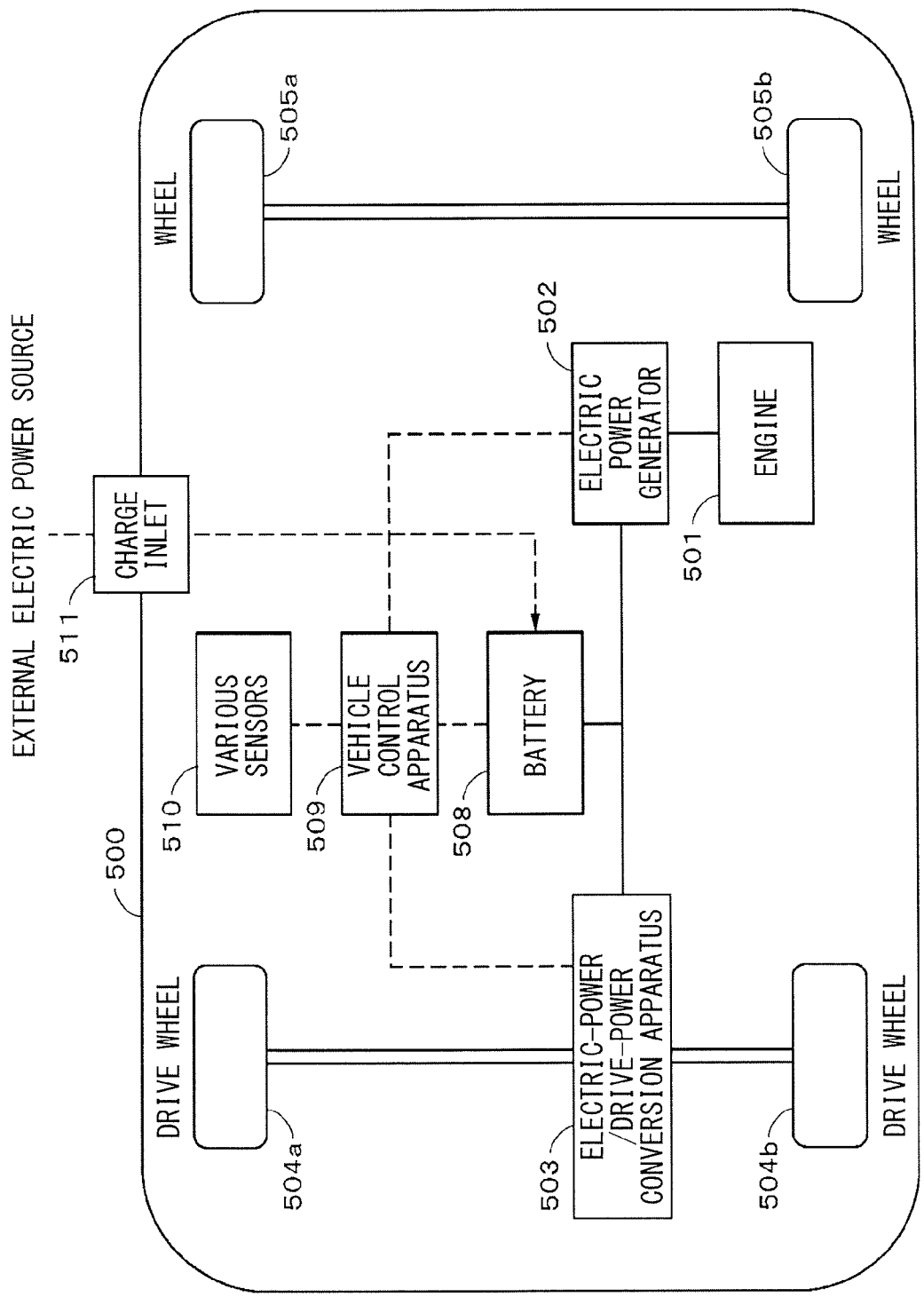
FIG. 9 is a schematic diagram roughly illustrating an example of a configuration of a hybrid vehicle adopting a series hybrid system to which the embodiment of the present application is applied.

A description will be given of an example in which the embodiment of the present application is applied to an electric power storage system for a vehicle referring to FIG. 9. FIG. 9 schematically illustrates an example of a configuration of a hybrid vehicle adopting a series hybrid system to which the embodiment of the present disclosure is applied. The series hybrid system is an automobile running with the use of an electric-power/drive-power conversion apparatus with the use of electric power generated by a power generator moved by an engine or such electric power that is once stored in a battery.

In a hybrid vehicle 500, an engine 501, a power generator 502, an electric-power/drive-power conversion apparatus 503, a drive wheel 504a, a drive wheel 504b, a wheel 505a, a wheel 505b, a battery 508, a vehicle control apparatus 509, various sensors 510, and a charge inlet 511 are included. The foregoing non-aqueous electrolyte battery according to the embodiment of the present disclosure is applied to the battery 508.

The hybrid vehicle 500 runs with the use of the electric-power/drive-power conversion apparatus 503 as a power source. Examples of the electric-power/drive-power conversion apparatus 503 may include a motor. The electric-power/drive-power conversion apparatus 503 is operated by electric power of the battery 508, and torque of the electric-power/drive-power conversion apparatus 503 is transferred to the drive wheels 504a and 504b. It is to be noted that, by using direct-current-alternating-current (DC-AC) conversion or reverse conversion (AC-DC conversion) at a necessary point, the electric-power/drive-power conversion apparatus 503 may be used as an alternating current motor or a direct current motor. The various sensors 510 control engine frequency through the vehicle control apparatus 509, and control opening level (throttle opening level) of an unillustrated throttle valve. The various sensors 510 may include a speed sensor, an acceleration sensor, an engine frequency sensor, and/or the like.

Torque of the engine 501 is transferred to the power generator 502. Electric power generated by the power generator 502 due to the torque is allowed to be stored in the battery 508.

When speed of the hybrid vehicle 500 is reduced by an unillustrated brake mechanism, resistance at the time of speed reduction is added to the electric-power/drive-power conversion device 503 as torque, and regenerative electric power generated by the electric-power/drive-power conversion apparatus 503 due to the torque is stored in the battery 508.

The battery 508 may be connected to an external electric power source of the hybrid vehicle 500, and thereby, may be supplied with electric power from the external electric power source through the charge inlet 511 as an input port, and may store the received electric power.

Although not illustrated, an information processing apparatus to perform information processing of vehicle control based on information on a secondary battery may be included. Examples of such an information processing apparatus may include an information processing apparatus to perform display of a remaining battery capacity based on information on the remaining battery capacity.

The description has been given of the series hybrid automobile running with the use of the motor using electric power generated by the electric power generator operated by the engine or such electric power that is once stored in the battery as an example. However, the embodiment of the present application is effectively applicable to a parallel hybrid automobile used by switching three methods of running only by an engine, running only by a motor, and running by the engine and the motor as appropriate with the use of both outputs of the engine and the motor as drive sources. Further, the embodiment of the present application is effectively applicable to a so-called electric vehicle running by drive only by a drive motor without using an engine.

EXAMPLES

Specific examples of the embodiment of the present application will be described below in detail. However, the embodiment of the present application is not limited thereto.

Example 1

Fabrication of Anode 96 parts by mass of pulverized graphite powder as an anode active material, 2 parts by mass of SBR (styrene-butadiene rubber) as a binder, 2 parts by mass of CMC (carboxymethyl cellulose), and ion-exchange water as a solvent were mixed to prepare anode mixture slurry. Next, a single surface of an anode current collector made of a copper foil being 12 µm thick was uniformly coated with the anode mixture slurry, further, the other surface thereof was uniformly coated with the anode mixture slurry, and the resultant was dried and was pressure-molded by a roll pressing machine so that the mixture layer had a predetermined density to form an anode mixture layer. Finally, the pressed electrode was slit up into a shape having a predetermined width, an Ni lead is attached onto the current collector by ultrasonic welding to fabricate an anode.

Upon fabricating the anode, formation regions of the anode mixture layer and area densities of the anode mixture layer were adjusted, and the double side non-coating section $22B_1$, the single-side coating section $22B_2$, and the double side coating section $22B_3$ were formed as illustrated in FIG. 4B. After the spiral winding, in the single-side coating section $22B_2$ on the side of spiral winding start, the anode mixture layer 22B was formed only on the one main surface to become the outer circumference side out of both the main surfaces of the anode current collector 22A. In contrast, in the single-side coating section $22B_2$ on the side of spiral winding end, the anode mixture layer 22B was formed only on the other main surface to become the inner circumference side out of both the main surfaces of the anode current collector 22A.

In the anode mixture layer 22B on the one main surface side indicated by the arrow p that was formed on the one main surface of the anode current collector 22A, an area density ratio of the anode mixture layer 22B on the one main surface side of the single-side coating section $22B_2$ on the side of spiral winding start obtained by the following expression was set to 1.36. It is to be noted that the area densities may be measured after, for example, once assembling a cell, charging the cell, discharging the cell until a voltage reached 2.5 V, disassembling the cell, and subsequently impregnating the disassembled cell with a DMC (dimethyl carbonate) solvent for predetermined time (30 minutes).

[Expression]

"Area density ratio of the anode mixture layer 22B on the one main surface side of the single-side coating section $22B_2$ on the side of spiral winding start"=("Area density of the anode mixture layer 22B on the one main surface side of the single-side coating section $22B_2$ on the side of spiral winding start")/("Area density of the anode mixture layer 22B on the one main surface side of sections other than the single-side coating section $22B_2$ on the side of spiral winding start")

In the following description, in some cases, "area density ratio of the anode mixture layer 22B on the one main surface side of the single-side coating section $22B_2$ on the side of spiral winding start" may be abbreviated as "area density ratio of the single-side coating section $22B_2$ on the side of spiral winding start." Further, in some cases, "area density of the anode mixture layer 22B on the one main surface side of the single-side coating section $22B_2$ on the side of spiral winding start" may be abbreviated as "area density of the single-side coating section $22B_2$ on the side of spiral winding start." Further, in some cases, "area density of the anode mixture layer 22B on the one main surface side of sections other than the single-side coating section $22B_2$ on the side of spiral winding start" may be abbreviated as "area density of sections other than the single-side coating section $22B_2$ on the side of spiral winding start."

Further, the width A of the single-side coating section $22B_2$ on the side of spiral winding start of the anode 22 and the width B of the double side non-coating section $22B_1$ on the side of spiral winding start of the anode 22 were as follows. It is to be noted that upon adjusting the foregoing area densities of the anode mixture layer, "the area density of the single-side coating section $22B_2$ on the side of spiral winding start" and "the area density of sections other than the single-side coating section $22B_2$ on the side of spiral winding start" were adjusted as follows.

Area density of the single-side coating section $22B_2$ on the side of spiral winding start: 19.5 mg/cm$^2$ Area density of sections other than the single-side coating section $22B_2$ on the side of spiral winding start: 14.3 mg/cm$^2$ Width A: 14 mm
Width B: 17 mm

Fabrication of Cathode 95 parts by mass of a cathode active material, 2.5 parts by mass of graphite as an electric conductor, and 2.5 parts by mass of polyvinylidene fluoride (PVDF) as a binder were mixed to obtain a cathode mixture. The mixture was dispersed in N-methyl-2-pyrrolidone as a solvent to obtain paste cathode mixture slurry. Next, excluding a cathode lead section, a single surface of a cathode current collector made of a strip-shaped aluminum foil being 15 µm thick was intermittently coated with the cathode mixture slurry uniformly, and the resultant was dried. Further, excluding the cathode lead section, the other surface thereof was intermittently coated with the cathode mixture slurry, the resultant was dried and was pressure-molded by a roll pressing machine to form a cathode mixture layer. The pressed electrode was slit up into a shape having a predetermined width. Thereafter, an Al lead being 100 µm thick was attached onto the current collector by ultrasonic welding, a lead in an intermediate blank section (double side non-coating section) and an exposed section of the Al current collector were covered with a PI (polyimide) tape, and thereby, a cathode electrode was fabricated. Further, the electrode was cut at laminated sections on the side of spiral winding start and on the side of spiral winding end so that no non-coating section exists except for in a non-coating section in the center of a cathode plate.

Fabrication of Electrolytic Solution

As an electrolytic solution, a solution containing a mixed solvent obtained by mixing ethylene carbonate (EC), ethylmethyl carbonate (EMC), and dimethyl carbonate (DMC) at a volume ratio of 2:2:6 and lithium hexafluorophosphate (LiPF$_6$) as an electrolyte salt was used. The concentration of lithium hexafluorophosphate (LiPF$_6$) in the electrolytic solution was 1 mol/dm$^3$ Separator As a separator, a porous film made of polyethylene being 20 μm thick was used.

Fabrication of Test Battery

Upon assembling a secondary battery, the cathode and the anode were layered with the separator in between and were spirally wound. Thereafter, an end portion of the spirally wound body was fixed by an adhesive tape to fabricate a spirally wound electrode body. At this time, an innermost circumference diameter M of the spirally wound electrode body was set to 11.5 mm.

Subsequently, a center pin was inserted into the center of the spirally wound electrode body. Subsequently, the spirally wound electrode body was sandwiched between a pair of insulating plates, and was contained in an iron battery can plated with nickel. In this case, one end tip of the cathode lead was attached to a safety valve mechanism by welding, and one end tip of the anode lead was attached to the battery can by welding. Subsequently, the electrolytic solution was injected into the battery can by a depressurization method, and the separator was impregnated with the electrolytic solution. Finally, at the open end of the battery can, a battery cover, the safety valve mechanism, and a PTC device were fixed by being swaged with a gasket. A cylindrical-type secondary battery (diameter: 18 mm, height: 65 mm) was completed thereby.

Example 2

Upon fabricating an anode, formation regions of an anode mixture layer and area densities of the anode mixture layer were adjusted as follows. Except for this point, a secondary battery was fabricated as in Example 1.
Area density of the single-side coating section $22B_2$ on the side of spiral winding start: 24.3 mg/cm$^2$
Area density of sections other than the single-side coating section $22B_2$ on the side of spiral winding start: 14.3 mg/cm$^2$
Area density ratio of the single-side coating section $22B_2$ on the side of spiral winding start: 1.70
Width A: 9 mm
Width B: 17 mm Example 3

Upon fabricating an anode, formation regions of an anode mixture layer and area densities of the anode mixture layer were adjusted as follows. Except for this point, a secondary battery was fabricated as in Example 1.
Area density of the single-side coating section $22B_2$ on the side of spiral winding start: 21.3 mg/cm$^2$
Area density of sections other than the single-side coating section $22B_2$ on the side of spiral winding start: 14.3 mg/cm$^2$
Area density ratio of the single-side coating section $22B_2$ on the side of spiral winding start: 1.49
Width A: 14 mm
Width B: 5 mm Example 4

Upon fabricating an anode, formation regions of an anode mixture layer and area densities of the anode mixture layer were adjusted as follows. Further, the innermost circumference diameter M of a spirally wound electrode body was 9.4 mm. Except for these points, a secondary battery was fabricated as in Example 1.
Area density of the single-side coating section $22B_2$ on the side of spiral winding start: 21.3 mg/cm$^2$
Area density of sections other than the single-side coating section $22B_2$ on the side of spiral winding start: 14.3 mg/cm$^2$
Area density ratio of the single-side coating section $22B_2$ on the side of spiral winding start: 1.49
Width A: 12 mm
Width B: 15 mm Example 5

Upon fabricating an anode, formation regions of an anode mixture layer and area densities of the anode mixture layer were adjusted as follows. Except for this point, a secondary battery was fabricated as in Example 1.
Area density of the single-side coating section $22B_2$ on the side of spiral winding start: 12.4 mg/cm$^2$
Area density of sections other than the single-side coating section $22B_2$ on the side of spiral winding start: 7.3 mg/cm$^2$
Area density ratio of the single-side coating section $22B_2$ on the side of spiral winding start: 1.70
Width A: 6 mm
Width B: 2 mm Example 6

Upon fabricating an anode, formation regions of an anode mixture layer and area densities of the anode mixture layer were adjusted as follows. Except for this point, a secondary battery was fabricated as in Example 1.
Area density of the single-side coating section $22B_2$ on the side of spiral winding start: 11.2 mg/cm$^2$
Area density of sections other than the single-side coating section $22B_2$ on the side of spiral winding start: 7.3 mg/cm$^2$
Area density ratio of the single-side coating section $22B_2$ on the side of spiral winding start: 1.53
Width A: 14 mm
Width B: 17 mm Example 7

Upon fabricating an anode, formation regions of an anode mixture layer and area densities of the anode mixture layer were adjusted as follows. Except for this point, a secondary battery was fabricated as in Example 1.
Area density of the single-side coating section $22B_2$ on the side of spiral winding start: 9.8 mg/cm$^2$
Area density of sections other than the single-side coating section $22B_2$ on the side of spiral winding start: 7.3 mg/cm$^2$
Area density ratio of the single-side coating section $22B_2$ on the side of spiral winding start: 1.34
Width A: 14 mm
Width B: 17 mm Example 8

Upon fabricating an anode, formation regions of an anode mixture layer and area densities of the anode mixture layer were adjusted as follows. Except for this point, a secondary battery was fabricated as in Example 1.
Area density of the single-side coating section $22B_2$ on the side of spiral winding start: 8.5 mg/cm$^2$
Area density of sections other than the single-side coating section $22B_2$ on the side of spiral winding start: 7.1 mg/cm$^2$ Area density ratio of the single-side coating section $22B_2$ on the side of spiral winding start: 1.20
Width A: 14 mm
Width B: 17 mm Example 9

Upon fabricating an anode, formation regions of an anode mixture layer and area densities of the anode mixture layer were adjusted as follows. Except for this point, a secondary battery was fabricated as in Example 1.
Area density of the single-side coating section $22B_2$ on the side of spiral winding start: 11.2 mg/cm$^2$
Area density of sections other than the single-side coating section $22B_2$ on the side of spiral winding start: 7.3 mg/cm$^2$
Area density ratio of the single-side coating section $22B_2$ on the side of spiral winding start: 1.53
Width A: 21 mm
Width B: 17 mm Example 10

Upon fabricating an anode, formation regions of an anode mixture layer and area densities of the anode mixture layer were adjusted as follows. Except for this point, a secondary battery was fabricated as in Example 1.
Area density of the single-side coating section $22B_2$ on the side of spiral winding start: 11.2 mg/cm$^2$
Area density of sections other than the single-side coating section $22B_2$ on the side of spiral winding start: 7.3 mg/cm$^2$
Area density ratio of the single-side coating section $22B_2$ on the side of spiral winding start: 1.53
Width A: 14 mm
Width B: 5 mm Example 11

Upon fabricating an anode, formation regions of an anode mixture layer and area densities of the anode mixture layer were adjusted as follows. Except for this point, a secondary battery was fabricated as in Example 1.
Area density of the single-side coating section $22B_2$ on the side of spiral winding start: 11.2 mg/cm$^2$
Area density of sections other than the single-side coating section $22B_2$ on the side of spiral winding start: 7.3 mg/cm$^2$
Area density ratio of the single-side coating section $22B_2$ on the side of spiral winding start: 1.53
Width A: 14 mm
Width B: 25 mm Example 12

Upon fabricating an anode, formation regions of an anode mixture layer and area densities of the anode mixture layer were adjusted as follows. Except for this point, a secondary battery was fabricated as in Example 1.
Area density of the single-side coating section $22B_2$ on the side of spiral winding start: 11.2 mg/cm$^2$
Area density of sections other than the single-side coating section $22B_2$ on the side of spiral winding start: 7.3 mg/cm$^2$
Area density ratio of the single-side coating section $22B_2$ on the side of spiral winding start: 1.53
Width A: 14 mm
Width B: 28 mm Example 13

Upon fabricating an anode, formation regions of an anode mixture layer and area densities of the anode mixture layer were adjusted as follows. Except for this point, a secondary battery was fabricated as in Example 1.
Area density of the single-side coating section $22B_2$ on the side of spiral winding start: 21.3 mg/cm$^2$
Area density of sections other than the single-side coating section $22B_2$ on the side of spiral winding start: 14.3 mg/cm$^2$
Area density ratio of the single-side coating section $22B_2$ on the side of spiral winding start: 1.49
Width A: 14 mm
Width B: 1 mm Example 14

Upon fabricating an anode, formation regions of an anode mixture layer and area densities of the anode mixture layer were adjusted as follows. Except for this point, a secondary battery was fabricated as in Example 1.
Area density of the single-side coating section $22B_2$ on the side of spiral winding start: 11.2 mg/cm$^2$
Area density of sections other than the single-side coating section $22B_2$ on the side of spiral winding start: 7.3 mg/cm$^2$
Area density ratio of the single-side coating section $22B_2$ on the side of spiral winding start: 1.53
Width A: 25 mm
Width B: 17 mm Comparative Example 1

Upon fabricating an anode, formation regions of an anode mixture layer and area densities of the anode mixture layer were adjusted as follows. Except for this point, a secondary battery was fabricated as in Example 1.
Area density of the single-side coating section $22B_2$ on the side of spiral winding start: 15.2 mg/cm$^2$
Area density of sections other than the single-side coating section $22B_2$ on the side of spiral winding start: 14.3 mg/cm$^2$
Area density ratio of the single-side coating section $22B_2$ on the side of spiral winding start: 1.06
Width A: 14 mm
Width B: 17 mm Comparative Example 2

Upon fabricating an anode, formation regions of an anode mixture layer and area densities of the anode mixture layer were adjusted as follows. Except for this point, a secondary battery was fabricated as in Example 1.
Area density of the single-side coating section $22B_2$ on the side of spiral winding start: 10.4 mg/cm$^2$
Area density of sections other than the single-side coating section $22B_2$ on the side of spiral winding start: 10.4 mg/cm$^2$
Area density ratio of the single-side coating section $22B_2$ on the side of spiral winding start: 1.00
Width A: 3 mm
Width B: 17 mm Comparative Example 3

Upon fabricating an anode, formation regions of an anode mixture layer and area densities of the anode mixture layer were adjusted as follows. Except for this point, a secondary battery was fabricated as in Example 1.
Area density of the single-side coating section $22B_2$ on the side of spiral winding start: 8.3 mg/cm$^2$
Area density of sections other than the single-side coating section $22B_2$ on the side of spiral winding start: 7.3 mg/cm$^2$ Area density ratio of the single-side coating section 22B$_2$ on the side of spiral winding start: 1.14
   Width A: 3 mm
   Width B: 17 mm Evaluation of Test Battery For the fabricated secondary batteries, "measurement of charge-discharge cycle characteristics" and "check of winding gaps and electrode wrinkles at the time of spiral winding" were performed, and results thereof were evaluated.

[a. Measurement of Charge-Discharge Cycle Characteristics]

Charge was performed on the test batteries of the respective examples and the respective comparative examples at a constant current of 1 A in an ambient temperature bath at 23 deg C. until a battery voltage reached 4.2 V. Subsequently, charge was performed on the test batteries of the respective examples and the respective comparative examples at a constant voltage of 4.2 V. Thereafter, discharge was performed on the test batteries of the respective examples and the respective comparative examples at a constant current of 5 A until a battery voltage reached 2.5 V, and a battery capacity (initial discharge capacity) at the time of the initial discharge was measured. Charge-discharge cycles were repeated under the foregoing conditions, and a discharge capacity after 500 cycles was measured. Cycle retention ratio (%)=[(discharge capacity after 500 cycles)/(initial discharge capacity)]$_{\times 100}$ was obtained.

b. Check of Winding Gaps and Electrode Wrinkles at the Time of Spiral Winding

Next, after 500 cycles, the cells were disassembled, and electrode winding gaps and electrode wrinkles were checked. In Examples 1 to 11 and Comparative example 1, no electrode winding gaps and no electrode wrinkles was checked. In contrast, in Examples 12 to 14 and Comparative examples 2 to 3, electrode wrinkles at the time of spiral winding were confirmed.

Evaluation results of Examples 1 to 14 and Comparative examples 1 to 3 are illustrated in Table 1.

TABLE 1

|  | Anode mixture layer on one main surface side of single-side coating section | | Anode mixture layer on one main surface of sections other than single-side coating section | | | | | | Winding gaps and electrode wrinkles at the time of spiral winding | Cycle retention ratio (%) |
|---|---|---|---|---|---|---|---|---|---|---|
|  | Area density (mg/cm$^2$) | Area density ratio | Area density (mg/cm$^2$) | A (mm) | B (mm) | M (mm) | Ratio (A/M) | Ratio (B/M) | | |
| Example 1 | 19.5 | 1.36 | 14.3 | 14 | 17 | 11.5 | 1.2 | 1.5 | Not present | 87 |
| Example 2 | 24.3 | 1.70 | 14.3 | 9 | 17 | 11.5 | 0.8 | 1.5 | Not present | 85 |
| Example 3 | 21.3 | 1.49 | 14.3 | 14 | 5 | 11.5 | 1.2 | 0.4 | Not present | 87 |
| Example 4 | 21.3 | 1.49 | 14.3 | 12 | 15 | 9.4 | 1.3 | 1.6 | Not present | 87 |
| Example 5 | 12.4 | 1.70 | 7.3 | 6 | 2 | 11.5 | 0.5 | 0.2 | Not present | 90 |
| Example 6 | 11.2 | 1.53 | 7.3 | 14 | 17 | 11.5 | 1.2 | 1.5 | Not present | 93 |
| Example 7 | 9.8 | 1.34 | 7.3 | 14 | 17 | 11.5 | 1.2 | 1.5 | Not present | 95 |
| Example 8 | 8.5 | 1.20 | 7.1 | 14 | 17 | 11.5 | 1.2 | 1.5 | Not present | 91 |
| Example 9 | 11.2 | 1.53 | 7.3 | 21 | 17 | 11.5 | 1.8 | 1.5 | Not present | 93 |
| Example 10 | 11.2 | 1.53 | 7.3 | 14 | 5 | 11.5 | 1.2 | 0.4 | Not present | 89 |
| Example 11 | 11.2 | 1.53 | 7.3 | 14 | 25 | 11.5 | 1.2 | 2.2 | Not present | 93 |
| Example 12 | 11.2 | 1.53 | 7.3 | 14 | 28 | 11.5 | 1.2 | 2.4 | Present | 91 |
| Example 13 | 21.3 | 1.49 | 14.3 | 14 | 1 | 11.5 | 1.2 | 0.1 | Present | 82 |
| Example 14 | 11.2 | 1.53 | 7.3 | 25 | 17 | 11.5 | 2.2 | 1.5 | Present | 88 |
| Comparative example 1 | 15.2 | 1.06 | 14.3 | 14 | 17 | 11.5 | 1.2 | 1.5 | Not present | 54 |
| Comparative example 2 | 10.4 | 1.00 | 10.4 | 3 | 17 | 11.5 | 0.3 | 1.5 | Present | 63 |
| Comparative example 3 | 8.3 | 1.14 | 7.3 | 3 | 17 | 11.5 | 0.3 | 1.5 | Present | 68 |

As illustrated in Table 1, in Example 1 to Example 14, each of the area density ratios in each of the single-side coating sections on the side of spiral winding start was equal to or larger than 1.20, and therefore, each of the cycle retention ratios was favorable. In contrast, in Comparative example 1 to Comparative example 3, each of the area density ratios in each of the single-side coating sections on the side of spiral winding start was smaller than 1.20, and therefore, each of the cycle retention ratios was not favorable. In Example 12 and Example 13, each of B/M was out of the range from 0.2 to 2.2 both inclusive, winding gaps and electrode wrinkles at the time of spiral winding were generated. In Comparative example 2, Comparative example 3, and Example 14, each of A/M was out of the range from 0.5 to 1.8 both inclusive, and therefore, winding gaps and electrode wrinkles at the time of spiral winding were generated.

4. Other Embodiments

The present application is not limited to the foregoing preferred embodiments, and may be variously modified or applicative without departing from the scope of the invention.

For example, the numerical values, the structures, the shapes, the materials, the raw materials, the manufacturing processes, and the like described in the foregoing embodiments and Examples are merely examples. As necessary, numerical values, structures, shapes, materials, raw materials, manufacturing processes, and the like different from those of the foregoing embodiments and Examples.

Further, the structures, the methods, the steps, the shapes, the materials, the numerical values, and the like of the foregoing embodiments and Examples may be combined with each other without departing from the scope of the invention.

In the foregoing embodiments, the spirally wound electrode body includes the cathode, the anode, and the separator that is located between the cathode and the anode and that prevents short-circuit between the cathode and the anode. However, an ion conductor such as a gel electrolyte and a solid electrolyte may be used instead of the separator. Further, the spirally wound electrode body may include an ion conductor such as a gel electrolyte and a solid electrolyte in which a polymer compound is swollen with an electrolytic solution together with the separator. Further, the present application is applicable not only to a secondary battery but also to a primary battery.

Further, in the foregoing embodiments and Examples, the description has been given of a case in which the can outer package member is used. However, a film-like outer package member may be used.

Figure 10:
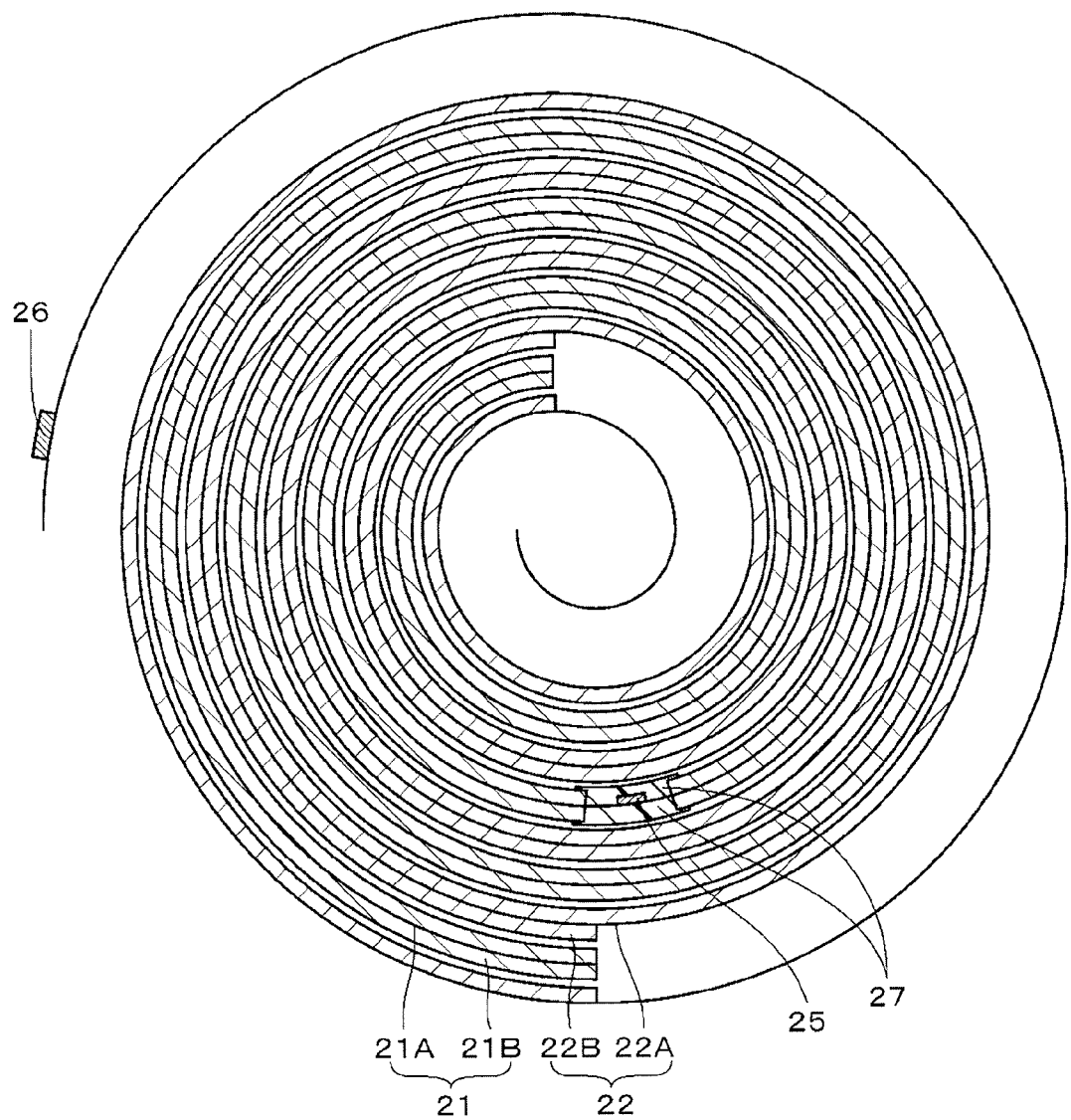
FIG. 10 is a cross-sectional view illustrating a spirally wound surface of a spirally wound electrode body of another example of the non-aqueous electrolyte battery according to the embodiment of the present application.

In the foregoing embodiments, the description has been given of the cylindrical-type non-aqueous electrolyte battery in which one of the leads 26 connected to the anode is provided in the end on the side of spiral winding end of the strip-shaped anode current collector, and the other one of the leads 26 connected to the anode is provided in the end on the side of spiral winding start of the strip-shaped anode current collector. However, the configuration of the anode lead 26 is not limited thereto. For example, only one lead 26 connected to the anode may be provided in the end on the side of spiral winding end of the strip-shaped anode current collector. FIG. 10 illustrates a cross-sectional view of a spirally wound surface of a spirally wound electrode body in another example of a cylindrical-type non-aqueous electrolyte battery having such a configuration. As illustrated in FIG. 10, in the spirally wound electrode body 20, only one lead 26 connected to the anode 22 is provided in the end on the side of spiral winding end of the strip-shaped anode current collector 22A.

It is possible to achieve at least the following configurations from the above-described example embodiments of the disclosure.

(1) A battery including a spirally wound electrode body, the spirally wound electrode body including a cathode and an anode that are spirally wound, wherein
the anode includes:
an anode double side coating section where an anode mixture layer is formed on both main surfaces of an anode current collector;
a first anode single-side coating section where the anode mixture layer is formed only on a first main surface located on an outer circumference side out of both the main surfaces of the anode current collector; and
an anode double side non-coating section where both surfaces of the anode current collector are exposed,
the anode double side non-coating section, the first anode single-side coating section, and the anode double side coating section are provided in this order from a first end on the side of spiral winding start of the anode, and
in an anode mixture layer on the first main surface side formed on the first main surface of the anode current collector, an area density ratio of the anode mixture layer on the first main surface side of the first anode single-side coating section is equal to or more than about 1.2, the area density ratio being expressed by a following expression,
[Expression]
Area density ratio of the anode mixture layer on the first main surface side=("Area density of the anode mixture layer on the first main surface side of the first anode single-side coating section")/("Area density of the anode mixture layer on the first main surface side of sections other than the first anode single-side coating section").

(2) The battery according to (1) further including a second anode single-side coating section where the anode mixture layer is formed only on a second main surface located on an inner circumference side out of both the main surfaces of the anode current collector, wherein
the second anode single-side coating section and the anode double side non-coating section are provided in this order from a first end on the side of spiral winding end of the anode double side coating section to a second end on the side of spiral winding end of the anode.

(3) The battery according to (1) or (2), wherein
the cathode comprises:
a cathode double side coating section where a cathode mixture layer is formed on both main surfaces of a cathode current collector; and
a cathode double side non-coating section where both surfaces of the cathode current collector are exposed, and
the cathode double side coating section, the cathode double side non-coating section, and the cathode double side coating section are provided in this order from a first end on the side of spiral winding start of the cathode to a second end on the side of spiral winding end of the cathode.

(4) The battery according to (3), wherein
the double side non-coating section is arranged substantially in a center of the cathode, and
a lead is joined to an exposed surface of the cathode current collector of the cathode double side non-coating section located on an inner circumference side.

(5) The battery according to (3), wherein
the double side non-coating section is arranged substantially in a center of the cathode, and
a lead is joined to an exposed surface of the cathode current collector of the cathode double side non-coating section located on an outer circumference side.

(6) The battery according to any one of (1) to (5), wherein the area density ratio of the anode mixture layer on the first main surface side is from about 1.2 to about 1.7 both inclusive.

(7) The battery according to any one of (1) to (6), wherein a width of the first anode single-side coating section is from about 6 mm to about 21 mm both inclusive.

(8) The battery according to any one of (1) to (7), wherein where a width of the first anode single-side coating section is A, a width of the anode double side non-coating section on the side of spiral winding start is B, and an innermost circumference diameter of the spirally wound electrode body is M, 0.5M≤A≤1.8M and 0.2M≤B≤2.2M are satisfied.

(9) A battery pack provided with a battery, a control section configured to control the battery, and an outer package containing the battery,
the battery including:
a spirally wound electrode body, the spirally wound electrode body including a cathode and an anode that are spirally wound, wherein
the anode includes:
an anode double side coating section where an anode mixture layer is formed on both main surfaces of an anode current collector;
a first anode single-side coating section where the anode mixture layer is formed only on a first main surface located on an outer circumference side out of both the main surfaces of the anode current collector; and
an anode double side non-coating section where both surfaces of the anode current collector are exposed,
the anode double side non-coating section, the first anode single-side coating section, and the anode double side coating section are provided in this order from a first end on the side of spiral winding start of the anode, and
in an anode mixture layer on the first main surface side formed on the first main surface of the anode current collector, an area density ratio of the anode mixture layer on the first main surface side of the first anode single-side coating section is equal to or more than about 1.2, the area density ratio being expressed by a following expression,
[Expression]
Area density ratio of the anode mixture layer on the first main surface side=("Area density of the anode mixture layer on the first main surface side of the first anode single-side coating section")/("Area density of the anode mixture layer on the first main surface side of sections other than the first anode single-side coating section").

(10) An electronic apparatus provided with a battery and configured to receive electric power from the battery,
the battery including:
a spirally wound electrode body, the spirally wound electrode body including a cathode and an anode that are spirally wound, wherein
the anode includes:
an anode double side coating section where an anode mixture layer is formed on both main surfaces of an anode current collector;
a first anode single-side coating section where the anode mixture layer is formed only on a first main surface located on an outer circumference side out of both the main surfaces of the anode current collector; and
an anode double side non-coating section where both surfaces of the anode current collector are exposed,
the anode double side non-coating section, the first anode single-side coating section, and the anode double side coating section are provided in this order from a first end on the side of spiral winding start of the anode, and
in an anode mixture layer on the first main surface side formed on the first main surface of the anode current collector, an area density ratio of the anode mixture layer on the first main surface side of the first anode single-side coating section is equal to or more than about 1.2, the area density ratio being expressed by a following expression,
[Expression]
Area density ratio of the anode mixture layer on the first main surface side=("Area density of the anode mixture layer on the first main surface side of the first anode single-side coating section")/("Area density of the anode mixture layer on the first main surface side of sections other than the first anode single-side coating section").

(11) An electric vehicle provided with a battery, a conversion apparatus configured to convert electric power supplied from the battery into drive power of the vehicle, and a control apparatus configured to process information on vehicle control based on information on the battery,
the battery including:
a spirally wound electrode body, the spirally wound electrode body including a cathode and an anode that are spirally wound, wherein
the anode includes:
an anode double side coating section where an anode mixture layer is formed on both main surfaces of an anode current collector;
a first anode single-side coating section where the anode mixture layer is formed only on a first main surface located on an outer circumference side out of both the main surfaces of the anode current collector; and
an anode double side non-coating section where both surfaces of the anode current collector are exposed,
the anode double side non-coating section, the first anode single-side coating section, and the anode double side coating section are provided in this order from a first end on the side of spiral winding start of the anode, and
in an anode mixture layer on the first main surface side formed on the first main surface of the anode current collector, an area density ratio of the anode mixture layer on the first main surface side of the first anode single-side coating section is equal to or more than about 1.2, the area density ratio being expressed by a following expression,
[Expression]
Area density ratio of the anode mixture layer on the first main surface side=("Area density of the anode mixture layer on the first main surface side of the first anode single-side coating section")/("Area density of the anode mixture layer on the first main surface side of sections other than the first anode single-side coating section").

(12) An electric power storage apparatus provided with a battery and configured to supply electric power to an electronic apparatus connected to the battery,
the battery including:
a spirally wound electrode body, the spirally wound electrode body including a cathode and an anode that are spirally wound, wherein
the anode includes:
an anode double side coating section where an anode mixture layer is formed on both main surfaces of an anode current collector;
a first anode single-side coating section where the anode mixture layer is formed only on a first main surface located on an outer circumference side out of both the main surfaces of the anode current collector; and
an anode double side non-coating section where both surfaces of the anode current collector are exposed,
the anode double side non-coating section, the first anode single-side coating section, and the anode double side coating section are provided in this order from a first end on the side of spiral winding start of the anode, and in an anode mixture layer on the first main surface side formed on the first main surface of the anode current collector, an area density ratio of the anode mixture layer on the first main surface side of the first anode single-side coating section is equal to or more than about 1.2, the area density ratio being expressed by a following expression,

[Expression]

Area density ratio of the anode mixture layer on the first main surface side=("Area density of the anode mixture layer on the first main surface side of the first anode single-side coating section")/("Area density of the anode mixture layer on the first main surface side of sections other than the first anode single-side coating section").

(13) The electric power storage apparatus according to (12) including an electric power information control apparatus, the electric power information control apparatus transmitting and receiving a signal to and from other apparatus through a network, wherein the electric power storage apparatus performs charge-discharge control of the battery based on information received by the electric power information control apparatus.

(14) An electric power system, the electric power system being configured to receive electric power from a battery, or in which the electric power is supplied from an electric power generating apparatus or an electric power network to the battery, the battery including:

a spirally wound electrode body, the spirally wound electrode body including a cathode and an anode that are spirally wound, wherein the anode includes:

an anode double side coating section where an anode mixture layer is formed on both main surfaces of an anode current collector;

a first anode single-side coating section where the anode mixture layer is formed only on a first main surface located on an outer circumference side out of both the main surfaces of the anode current collector; and an anode double side non-coating section where both surfaces of the anode current collector are exposed, the anode double side non-coating section, the first anode single-side coating section, and the anode double side coating section are provided in this order from a first end on the side of spiral winding start of the anode, and in an anode mixture layer on the first main surface side formed on the first main surface of the anode current collector, an area density ratio of the anode mixture layer on the first main surface side of the first anode single-side coating section is equal to or more than about 1.2, the area density ratio being expressed by a following expression,

[Expression]

Area density ratio of the anode mixture layer on the first main surface side=("Area density of the anode mixture layer on the first main surface side of the first anode single-side coating section")/("Area density of the anode mixture layer on the first main surface side of sections other than the first anode single-side coating section").

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery comprising a spirally wound electrode body, the spirally wound electrode body including a cathode and an anode that are spirally wound, wherein:

the anode includes:

an anode double side coating section where an anode mixture layer is formed on a first main surface and a second main surface of an anode current collector;

a first anode single-side coating section where the anode mixture layer is formed only on the first main surface located on an outer circumference side of the anode current collector; and an anode double side non-coating section where the first main surface and the second main surface of the anode current collector are exposed, the anode double side non-coating section, the first anode single-side coating section, and the anode double side coating section are provided in this order from a spiral winding start end of the anode, and in an anode mixture layer on a first main surface side formed on the first main surface of the anode current collector, an area density ratio of the anode mixture layer on the first main surface side of the first anode single-side coating section is equal to or more than about 1.2, where the area density ratio of the anode mixture layer on the first main surface side= (an area density of the anode mixture layer on the first main surface side of the first anode single-side coating section)/(an area density of the anode mixture layer on the first main surface side of sections of the anode other than the first anode single-side coating section).

2. The battery according to claim 1 further comprising a second anode single-side coating section where the anode mixture layer is formed only on the second main surface located on an inner circumference side of the anode current collector, wherein the second anode single-side coating section and the anode double side non-coating section are provided in this order from a spiral winding start end of the anode to a spiral winding terminal end of the anode.

3. The battery according to claim 1, wherein:

the cathode comprises:

a cathode double side coating section where a cathode mixture layer is formed on a first main surface and a second main surface of a cathode current collector; and a cathode double side non-coating section where the first main surface and the second main surface of the cathode current collector are exposed, and the cathode double side coating section, the cathode double side non-coating section, and the cathode double side coating section are provided in this order from a spiral winding start end of the cathode to a spiral winding terminal end of the cathode.

4. The battery according to claim 3, wherein the cathode double side non-coating section is arranged substantially in a center of the cathode, and a lead is joined to an exposed surface of the cathode current collector of the cathode double side non-coating section located on an inner circumference side of the cathode current collector.

5. The battery according to claim 3, wherein the cathode double side non-coating section is arranged substantially in a center of the cathode, and a lead is joined to an exposed surface of the cathode current collector of the cathode double side non-coating section located on an outer circumference side of the cathode current collector.

6. The battery according to claim 1, wherein the area density ratio of the anode mixture layer on the first main surface side of the first anode single-side coating section is from about 1.2 to about 1.7 both inclusive.

7. The battery according to claim 1, wherein a width of the first anode single-side coating section is from about 6 mm to about 21 mm both inclusive.

8. The battery according to claim 1, wherein where a width of the first anode single-side coating section is A, a width of the anode double side non-coating section is B, and an innermost circumference diameter of the spirally wound electrode body is M, $0.5M \leq A \leq 1.8M$ and $0.2M \leq B \leq 2.2M$ are satisfied.

9. A battery pack provided with a battery, a control section configured to control the battery, and an outer package containing the battery,
the battery comprising:
a spirally wound electrode body, the spirally wound electrode body including a cathode and an anode that are spirally wound, wherein:
the anode includes:
an anode double side coating section where an anode mixture layer is formed on a first main surface and a second main surface of an anode current collector;
a first anode single-side coating section where the anode mixture layer is formed only on the first main surface located on an outer circumference side of the anode current collector; and
an anode double side non-coating section where the first main surface and the second main surface of the anode current collector are exposed,
the anode double side non-coating section, the first anode single-side coating section, and the anode double side coating section are provided in this order from a spiral winding start end of the anode, and
in an anode mixture layer on a first main surface side formed on the first main surface of the anode current collector, an area density ratio of the anode mixture layer on the first main surface side of the first anode single-side coating section is equal to or more than about 1.2, where the area density ratio
of the anode mixture layer on the first main surface side= (an area density of the anode mixture layer on the first main surface side of the first anode single-side coating section)/(an area density of the anode mixture layer on the first main surface side of sections of the anode other than the first anode single-side coating section).

10. An electronic apparatus provided with a battery and configured to receive electric power from the battery,
the battery comprising:
a spirally wound electrode body, the spirally wound electrode body including a cathode and an anode that are spirally wound, wherein:
the anode includes:
an anode double side coating section where an anode mixture layer is formed on a first main surface and a second main surface of an anode current collector;
a first anode single-side coating section where the anode mixture layer is formed only on the first main surface located on an outer circumference side of the anode current collector; and
an anode double side non-coating section where the first main surface and the second main surface of the anode current collector are exposed,
the anode double side non-coating section, the first anode single-side coating section, and the anode double side coating section are provided in this order from a spiral winding start end of the anode, and
in an anode mixture layer on a first main surface side formed on the first main surface of the anode current collector, an area density ratio of the anode mixture layer on the first main surface side of the first anode single-side coating section is equal to or more than about 1.2, where the area density ratio
of the anode mixture layer on the first main surface side= (an area density of the anode mixture layer on the first main surface side of the first anode single-side coating section)/(an area density of the anode mixture layer on the first main surface side of sections of the anode other than the first anode single-side coating section).

11. An electric vehicle provided with a battery, a conversion apparatus configured to convert electric power supplied from the battery into drive power of the vehicle, and a control apparatus configured to process information on vehicle control based on information on the battery,
the battery comprising:
a spirally wound electrode body, the spirally wound electrode body including a cathode and an anode that are spirally wound, wherein:
the anode includes:
an anode double side coating section where an anode mixture layer is formed on a first main surface and a second main surface of an anode current collector;
a first anode single-side coating section where the anode mixture layer is formed only on the first main surface located on an outer circumference side of the anode current collector; and
an anode double side non-coating section where the first main surface and the second main surface of the anode current collector are exposed,
the anode double side non-coating section, the first anode single-side coating section, and the anode double side coating section are provided in this order from a spiral winding start end of the anode, and
in an anode mixture layer on a first main surface side formed on the first main surface of the anode current collector, an area density ratio of the anode mixture layer on the first main surface side of the first anode single-side coating section is equal to or more than about 1.2, where the area density ratio
of the anode mixture layer on the first main surface side= (an area density of the anode mixture layer on the first main surface side of the first anode single-side coating section)/(an area density of the anode mixture layer on the first main surface side of sections of the anode other than the first anode single-side coating section).

12. An electric power storage apparatus provided with a battery and configured to supply electric power to an electronic apparatus connected to the battery,
the battery comprising:
a spirally wound electrode body, the spirally wound electrode body including a cathode and an anode that are spirally wound, wherein:
the anode includes:
an anode double side coating section where an anode mixture layer is formed on a first main surface and a second main surface of an anode current collector;
a first anode single-side coating section where the anode mixture layer is formed only on the first main surface located on an outer circumference side of the anode current collector; and an anode double side non-coating section where the first main surface and the second main surface of the anode current collector are exposed, the anode double side non-coating section, the first anode single-side coating section, and the anode double side coating section are provided in this order from a spiral winding start end of the anode, and in an anode mixture layer on a first main surface side formed on the first main surface of the anode current collector, an area density ratio of the anode mixture layer on the first main surface side of the first anode single-side coating section is equal to or more than about 1.2, where the area density ratio of the anode mixture layer on the first main surface side= (an area density of the anode mixture layer on the first main surface side of the first anode single-side coating section)/(an area density of the anode mixture layer on the first main surface side of sections other than the first anode single-side coating section).

13. The electric power storage apparatus according to claim 12 comprising an electric power information control apparatus, the electric power information control apparatus transmitting and receiving a signal to and from other apparatus through a network, wherein the electric power storage apparatus performs charge-discharge control of the battery based on information received by the electric power information control apparatus.

14. An electric power system, the electric power system being configured to receive electric power from a battery, or in which the electric power is supplied from an electric power generating apparatus or an electric power network to the battery, the battery comprising:

a spirally wound electrode body, the spirally wound electrode body including a cathode and an anode that are spirally wound, wherein:

the anode includes:
an anode double side coating section where an anode mixture layer is formed on a first main surface and a second main surface of an anode current collector;
a first anode single-side coating section where the anode mixture layer is formed only on the first main surface located on an outer circumference side of the anode current collector; and
an anode double side non-coating section where the first main surface and the second main surface of the anode current collector are exposed, the anode double side non-coating section, the first anode single-side coating section, and the anode double side coating section are provided in this order from a spiral winding start end of the anode, and in an anode mixture layer on the first main surface side formed on the first main surface of the anode current collector, an area density ratio of the anode mixture layer on the first main surface side of the first anode single-side coating section is equal to or more than about 1.2, where the area density ratio of the anode mixture layer on the first main surface side= (an area density of the anode mixture layer on the first main surface side of the first anode single-side coating section)/(an area density of the anode mixture layer on the first main surface side of sections other than the first anode single-side coating section).

\* \* \* \* \*